United States Patent [19]
Oda et al.

[11] Patent Number: 5,033,568
[45] Date of Patent: Jul. 23, 1991

[54] FOUR-WHEEL STEERING SYSTEM FOR AUTOMOTIVE VEHICLES

[75] Inventors: Susumu Oda, Toyota; Junichi Miyagi, Okazaki; Hidemi Masuda, Toyota; Keiichi Nakamura, Kariya; Kunihiko Eto, Toyota; Kiyotaka Kato, Nishio; Keiji Suzuki, Okazaki; Akira Ohnishi, Okazaki; Kozo Ohno, Okazaki; Fumio Ukai, Okazaki, all of Japan

[73] Assignees: Toyota Jidosha Kabushiki Kaisha, Aichi, Japan; Toyoda Koki Kabushiki Kaisha, Aichi, Japan

[21] Appl. No.: 500,456

[22] Filed: Mar. 28, 1990

[30] Foreign Application Priority Data

| Mar. 29, 1989 | [JP] | Japan | 1-80074 |
| Mar. 29, 1989 | [JP] | Japan | 1-80075 |
| Mar. 29, 1989 | [JP] | Japan | 1-80076 |
| May 31, 1989 | [JP] | Japan | 1-137978 |
| Sep. 26, 1989 | [JP] | Japan | 1-250033 |

[51] Int. Cl.$^5$ ............................... B62D 5/18
[52] U.S. Cl. ........................ 180/140; 280/91
[58] Field of Search ........................ 180/140; 280/91

[56] References Cited

U.S. PATENT DOCUMENTS

4,467,885 8/1984 Furukawa et al. ............... 280/91

FOREIGN PATENT DOCUMENTS

| 61-66065 | 5/1986 | Japan | 280/91 |
| 83471 | 3/1989 | Japan | 280/91 |
| 8700239 | 8/1988 | Netherlands | 280/91 |

*Primary Examiner*—Charles A. Marmor
*Assistant Examiner*—Alan M. Kagen
*Attorney, Agent, or Firm*—Oliff & Berridge

[57] ABSTRACT

A four-wheel steering system for an automotive vehicle in which a cable linkage is adapted to operatively interconnect front and rear wheel steering mechanisms. The cable linkage is provided with a displacement transmitting mechanism which includes an input element operatively connected to a front lateral bar in the front wheel steering mechanism through the cable linkage, an output element operatively connected to the rear wheel steering mechanism, and a spring element disposed between the input and output elements to transmit displacement of the input element to the output element without any deflection in a condition where the output element is freely movable and to absorb displacement of the input element in a condition where the output element is restrained by an excessive load applied thereto from the rear wheel steering mechanism.

11 Claims, 14 Drawing Sheets

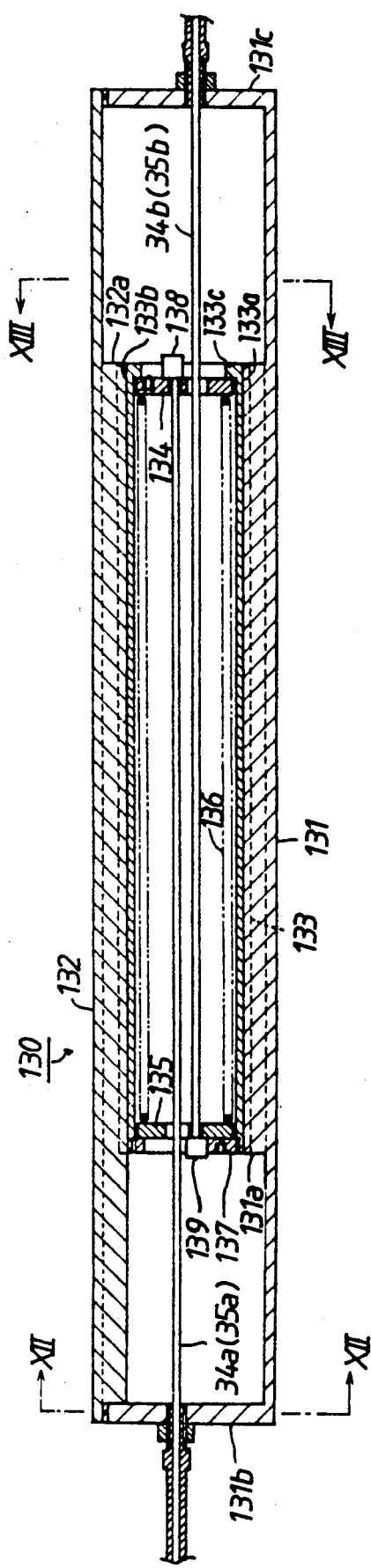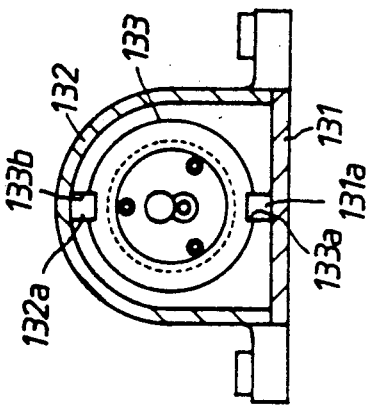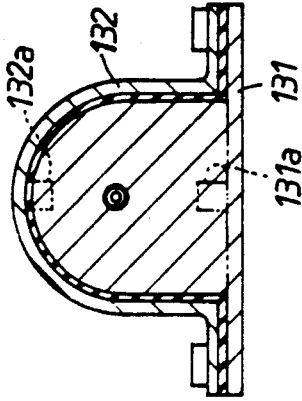

FOUR-WHEEL STEERING SYSTEM FOR AUTOMOTIVE VEHICLES

BACKGROUND OF THE INVENTION

1. Field of the Invention

The present invention relates to a four-wheel steering system for automotive vehicles, more particularly to a four-wheel steering system of the type in which a cable linkage is adapted to operatively connect a front wheel steering mechanism to a rear wheel steering mechanism.

2. Discussion of the Prior Art

In Japanese Utility Model Laid-Open Publication No. 61-66065, there has been proposed a four-wheel steering system of this type wherein a pair of cables is adapted to operatively connect a front wheel steering mechanism to a rear wheel steering mechanism. In operation of the front wheel steering mechanism, either one of the cables acts to transmit therethrough axial displacement of a front lateral bar or rod in the front wheel steering mechanism to the rear wheel steering mechanism thereby to steer a set of dirigible rear road wheels in accordance with steerage of a set of dirigible front road wheels. In the four-wheel steering system, however, the cables are applied with an excessive load from the front wheel steering mechanism when the front road wheels are steered in a condition where the rear road wheels are restrained by an excessive load acting thereon due to abutment with a road shoulder or falling in a roadside gutter. This results in unexpected disconnection of the cables or damage of the components of the rear wheel steering mechanism.

SUMMARY OF THE INVENTION

It is, therefore, a primary object of the present invention to provide an improved four-wheel steering system which includes a displacement transmitting mechanism capable of absorbing an excessive load acting on the cables during operation of the front wheel steering mechanism in a condition where the rear road wheels are restrained by an excessive load acting thereon.

A secondary object of the present invention is to provide an improved four-wheel steering system wherein the displacement transmitting mechanism can be manufactured in a simple construction and in a small size.

According to the present invention, the primary object is accomplished by providing a four-wheel steering system which comprises a front wheel steering mechanism operable in response to a steering effort applied thereto to steer a set of dirigible front road wheels, a rear wheel steering mechanism arranged to steer a set of dirigible rear road wheels in response to steerage of the front road wheels, and a cable linkage operatively interconnecting the front and rear wheel steering mechanisms, wherein a displacement transmitting mechanism is provided on the cable linkage to transmit axial displacement of a front lateral bar in the front wheel steering mechanism to the rear wheel steering mechanism. The displacement transmitting mechanism includes an input element operatively connected to the front lateral bar through the cable linkage, an output element operatively connected to the rear wheel steering mechanism, and resilient means disposed between the input and output elements to transmit displacement of the input element to the output element without any deflection in a condition where the output element is freely movable and to resiliently absorb displacement of the input element in a condition where the output element is restrained by an excessive load applied thereto from the rear wheel steering mechanism.

In a practical embodiment of the present invention, the input element is operatively connected to the front lateral bar at a position adjacent the front wheel steering mechanism, while the output element is operatively connected to the rear wheel steering mechanism through the cable linkage. Alternatively, the input element is operatively connected to the front wheel steering mechanism through a front section of the cable linkage, while the output element is operatively connected to the rear wheel steering mechanism through a rear section of the cable linkage.

BRIEF DESCRIPTION OF THE DRAWINGS

Additional objects, features and advantages of the present invention will become more readily apparent from the following detailed description of preferred embodiments thereof when taken together with the accompanying drawings, in which:

FIG. 11 is an enlarged sectional view of a buffering mechanism shown in FIG. 9;

FIG. 12 is a cross-sectional view taken along line XII—XII in FIG. 11;

FIG. 13 is a cross-sectional view taken along line XIII—XIII in FIG. 11;

DESCRIPTION OF THE PREFERRED EMBODIMENTS

Figure 1:
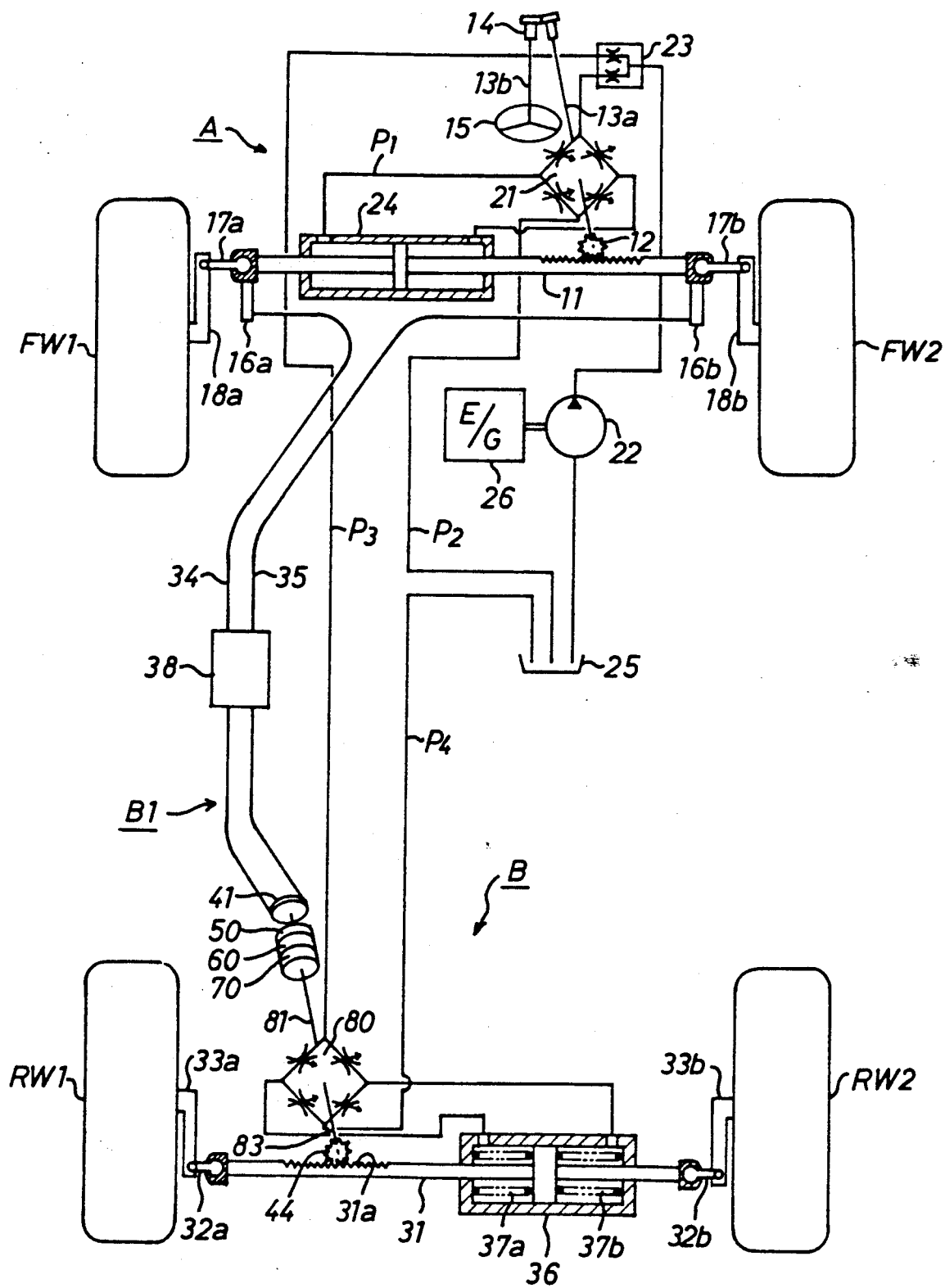
FIG. 1 is a schematic plan view of an automotive vehicle equipped with a four-wheel steering system in accordance with the present invention.

In FIG. 1 of the drawings, there is schematically illustrated an automotive vehicle equipped with a four-wheel steering system which comprises a front-wheel steering mechanism A arranged to steer a pair of dirigible front road wheels FW1, FW2 and a rear-wheel steering mechanism B arranged to steer a pair of dirigible rear road wheels RW1. RW2 in response to steerage of the front road wheels FW1, FW2.

The front-wheel steering mechanism A is in the form of a well-known steering mechanism which includes a lateral rack bar or rod 11 arranged to be axially displaced by operation of a steering wheel 15, a pair of tie rods 17a, 17b each connected to the opposite ends of rack bar 11 by means of a pair of rack ends 16a, 16b, and a pair of knuckle arms 18a, 18b each connected to the tie rods 17a, 17b to steer the front road wheels FW1, FW2 in response to axial displacement of the rack bar 11. The rack bar 11 is operatively connected to the steering wheel 15 through a pinion gear 12, a lower steering shaft 13a, intermeshed bevel gears 14 and an upper steering shaft 13b. The lower steering shaft 13a is provided thereon with a control valve 21 in the form of a four way valve which is responsive to the driver's steering effort applied thereto through steering shafts 13a, 13b to control the flow of hydraulic fluid under pressure supplied into a hydraulic power cylinder 24 from a hydraulic pump 22 through a flow dividing valve 23 and a conduit P$_1$ and to control the flow of hydraulic fluid discharged from the power cylinder 24 into a fluid reservoir 25 through a conduit P$_2$. The hydraulic pump 22 is driven by a prime mover 26 of the vehicle, and the power cylinder 24 is activated under control of the hydraulic fluid to assist steerage of the front road wheels FW1, FW2.

The rear wheel steering mechanism B includes a rear lateral rack bar 31 arranged to be axially displaced, a pair of tie rods 32a, 32b each connected to the opposite ends of rack bar 31, and a pair of knuckle arms 33a, 33b each connected to the tie rods 32a, 32b to steer the rear road wheels RW, RW2 in response to axial displacement of the lateral rack bar 31. The rear lateral rack bar 31 is operatively connected to the front lateral rack bar 11 by means of a displacement transmitting mechanism B1 which includes a pair of cables 34, 35, a steering angle setting mechanism 50, first and second buffering mechanisms 60, 70 and a control valve 80. The lateral rack bar 31 has a toothed portion 31a in mesh with a pinion 44 which is integrally provided with an output pinion shaft 83 of control valve 80. The control valve 80 is mounted on an input shaft 81 interconnected to the output pinion shaft 83 to control the hydraulic fluid under pressure supplied into a hydraulic power cylinder 36 from the hydraulic pump 22 through the flow dividing valve 23 and a conduit P$_3$ and to control the hydraulic fluid discharged from the power cylinder 36 into the fluid reservoir 25 through a conduit P$_4$. The lateral rack bar 31 is assisted by operation of the power cylinder 36 in its axial displacement under control of the control valve 80 and is biased by a pair of opposed springs 37a, 37b in power cylinder 36 to be retained in a neutral position. The cables 34, 35 are connected at their front ends to the rack ends 16a, 16b and extended rearwardly through a length adjuster 38. The rear ends of cables 34, 35 are wound around a pulley 41 and connected thereto.

Figure 2:
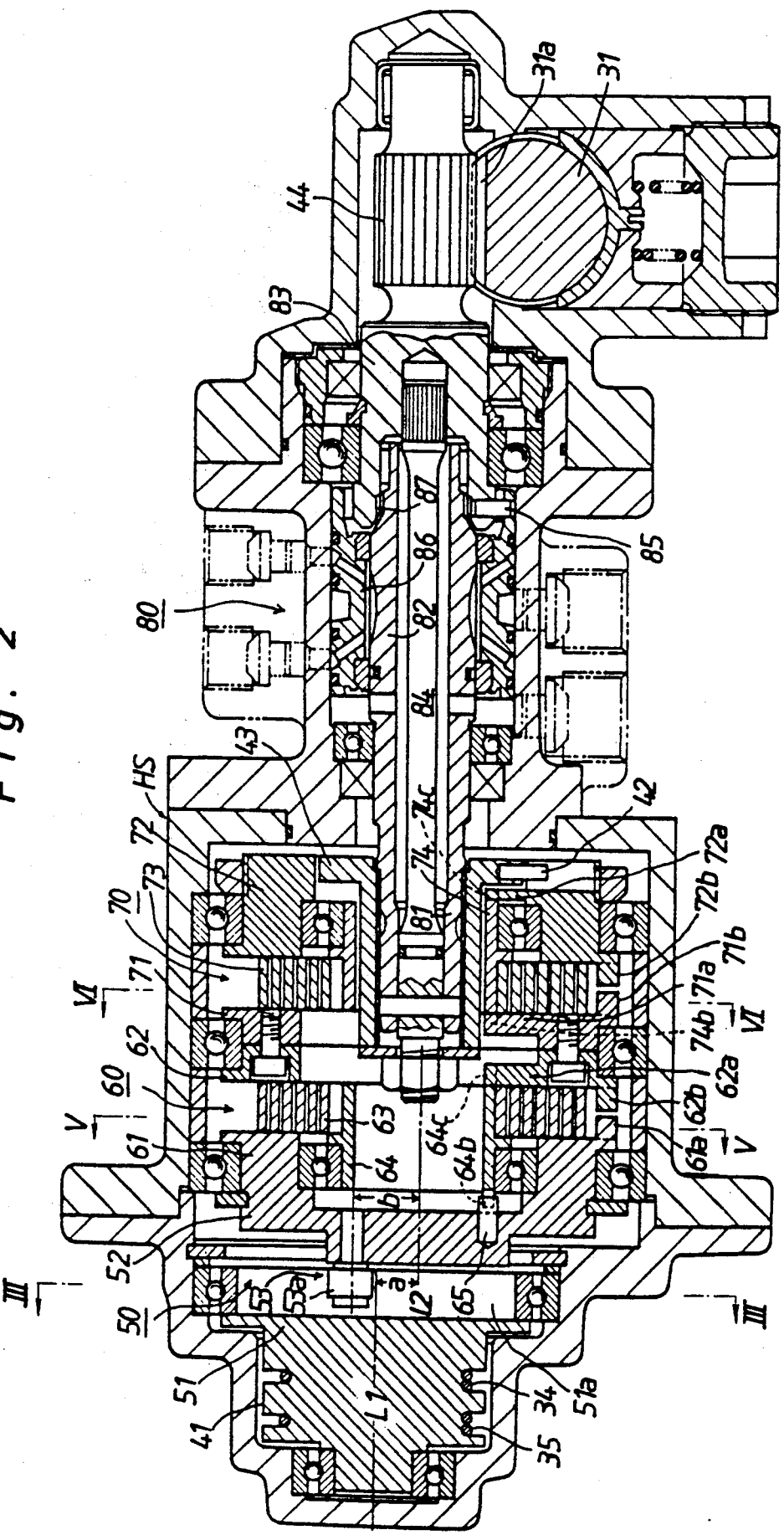
FIG. 2 is an enlarged sectional view of a displacement transmitting mechanism shown in FIG. 1.
Figure 3:
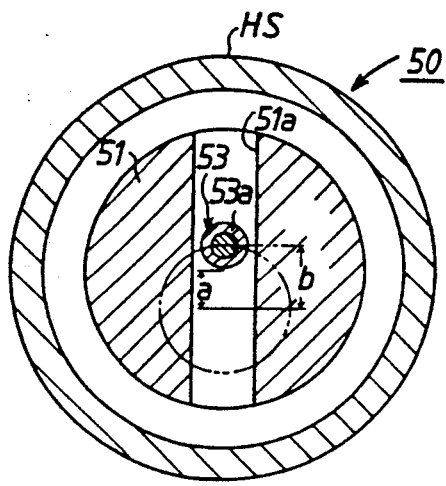
FIG. 3 is a cross-sectional view taken along line III—III in FIG. 2.
Figure 4:
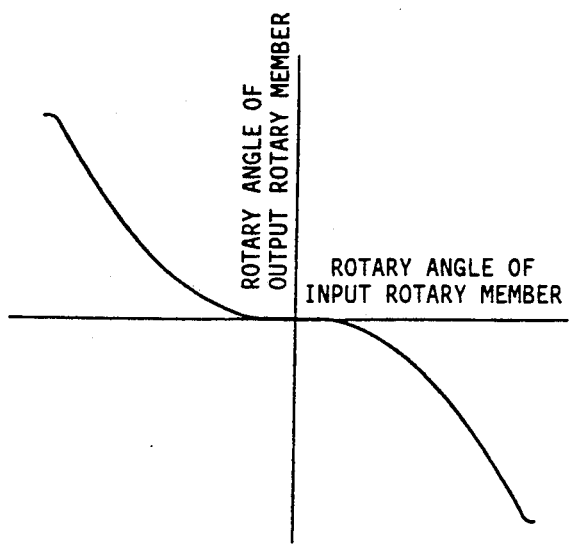
FIG. 4 is a graph showing a relationship between rotary angles of input and output rotary members in a steering angle setting mechanism shown in FIG. 2.

As shown in FIG. 2, a housing HS is formed to contain therein the pulley 41, steering angle setting mechanism 50, buffering mechanisms 60, 70 and control valve 80. The pulley 41 is integrally formed with an input rotary member 51 of steering angle setting mechanism 50 and is rotatably mounted within the housing HS to rotate about a first axis L1. As shown in FIGS. 2 and 3, a radial groove 51a is formed in the rear end of input rotary member 51 to contain therein an eccentric pin 53 fixed to an output rotary member 52. The output rotary member 52 is rotatably mounted within the housing Hs to rotate about a second axis L2 displaced downward in a distance a from the first axis L$_1$. The eccentric pin 53 is located in a position displaced upward in a distance b from the second axis L2. The eccentric pin 53 is provided thereon with a roller 53a which is spaced from a pair of parallel side faces of radial groove 51a in a condition where the pulley 41 is in a neutral position. In FIG. 4 there is illustrated a relationship between rotation angles of the input and output rotary members 51 and 52. When the input rotary member 51 is rotated at a smaller angle than a predetermined angle, the roller 53a of pin 53 may not be engaged with the parallel side faces of radial groove 51a. Thus, the output rotary member 52 is retained in a neutral position without any rotation. When the input rotary member 51 is rotated at a larger angle than the predetermined angle, the roller 53a of pin 53 is brought into engagement with one of the parallel side faces of radial groove 51a. Thus, the output rotary member 52 is rotated in accordance with the rotation angle of input rotary member 51.

Figure 5:
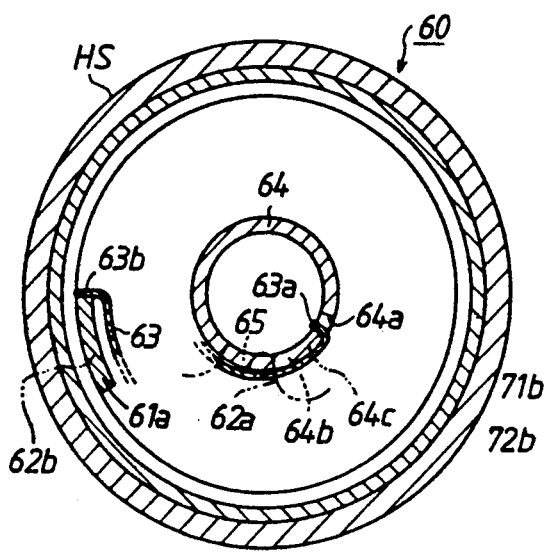
FIG. 5 is a cross-sectional view taken along line V—V in FIG. 2.

The first buffering mechanism 60 includes an input rotary member 61 integral with the output rotary member 52, an output rotary member 62 rotatably mounted within the housing HS coaxially with the input rotary member 61 to rotate about the second axis L2, and a spiral spring 63 disposed between the input and output rotary members 61 and 62. As shown in FIGS. 2 and 5, the spiral spring 63 is mounted on a support sleeve 64 which is rotatably carried by the input rotary member 61 to rotate about the second axis L2. As shown in FIG. 5, the spiral spring 63 has an inner end 63a engaged with a recess 64a of support sleeve 64 and an outer end 63b engaged with axial projections 61a and 62b of the input and output rotary members 61, 62. The support sleeve 64 has a front end 64b engaged with a pin 65 fixed to the input rotary member 61 for rotation therewith and a rear end 64c engaged with an internal radial projection 62a of output rotary member 62. When the input and output rotary members 61, 62 each are retained in a neutral position, the spiral spring 63 is preloaded to engage both the input and output rotary members 61 and 62 at its outer end 63b. The output rotary member 62 is fixed to an input rotary member 71 of the second buffering mechanism 70 for rotation therewith. The input rotary member 71 is rotatably mounted within the housing HS coaxially with the output rotary member 62 to rotate about the second axis L2.

Figure 6:
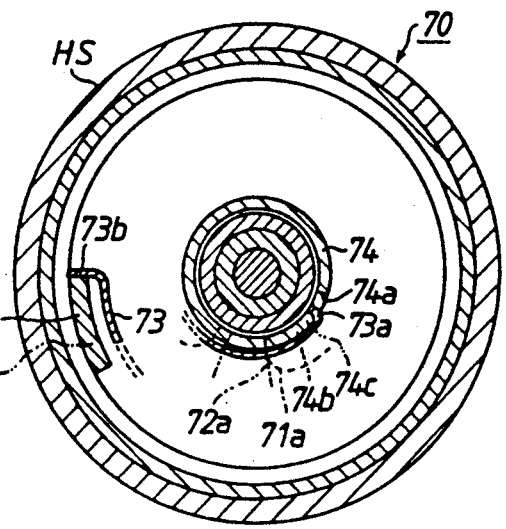
FIG. 6 is a cross-sectional view taken along line VI—VI in FIG. 2.

The second buffering mechanism 70 includes an output rotary member 72 rotatably mounted within the housing HS coaxially with the input rotary member 71 to rotate about the second axis L2 and a spiral spring 73 disposed between the input and output rotary members 71 and 72. As shown in FIGS. 2 and 6, the spiral spring 73 is mounted on a support sleeve 74 which is rotatably carried by the output rotary member 72 to rotate about the second axis L2. As shown in FIG. 6, the spiral spring 73 has an inner end 73a engaged with a recess 74a of support sleeve 74 and an outer end 73b engaged with axial projections 71b, 72b of rotary members 71, 72. As shown in FIG. 2, the support sleeve 74 has a front end 74b engaged with an internal radial projection 71a of input rotary member 71 and a rear end 74c engaged with an internal radial projection 72a of output rotary member 72. When the input and output rotary members 71, 72 each are in a neutral position, the spiral spring 73 is preloaded to engage both the input and output rotary members 71 and 72 at its outer end 73b. The preload of spiral spring 73 is substantially the same as that of spiral spring 63. The output rotary member 72 is connected to a connecting sleeve member 43 by means of a pin 42.

The control valve 80 is in the form of a servo valve of the rotary type which includes the input shaft 81 splined to the connecting sleeve member 43, a valve rotor 82 integrally formed on the input shaft 81, a torsion bar 84 connected at its front end to the input shaft 81 and at its read end to the output pinion shaft 83, and a valve sleeve 86 rotatably coupled with the valve rotor 82 and connected to the output pinion shaft 83 by means of a radial pin 85. In operation, the control valve 80 acts to control the hydraulic fluid supplied into and discharged from the power cylinder 36 in accordance with relative rotation of the valve rotor 82 and sleeve 86. In the control valve 80, a stopper 87 is provided in such a manner as to permit relative rotation of the input and output shafts 81 and 83 in a predetermined angle. The pinion 44 of output shaft 83 is meshed with the toothed portion 31a of rear lateral rack bar 31.

Assuming that the steering wheel 15 has been turned to the right or left, the lateral rack bar 11 is axially displaced by the driver's steering effort applied thereto through the steering shafts 13a, 13b. The axial displacement of rack bar 11 is transmitted to the front road wheels FW1, FW2 through the tie rods 17a, 17b and knuckle arms 18a, 18b to steer the front road wheels in a rightward or leftward direction In this instance, the control valve 21 is operated to control the hydraulic fluid supplied into and discharged from the power cylinder 24. Thus, the power cylinder 24 is activated to assist the steerage of front road wheels FW1, FW2. During the steerage of front road wheels FW1, FW2, the cable 34 or 35 is pulled forward in accordance with the axial displacement of rack bar 11 to rotate the pulley 41 counterclockwisely or clockwisely. The torque of pulley 41 is transmitted to the lateral rack bar 31 through the steering angle setting mechanism 50, buffering mechanisms 60, 70 and control valve 80 to cause axial displacement of the rack bar 31. The axial displacement of rack bar is transmitted to the rear road wheels RW1, RW2 through the tie 32a, 32b and knuckle arms 33a, 33b to steer the rear road wheels in a leftward or rightward direction. In this instance, the control valve 80 is operated to control the hydraulic fluid supplied into and discharged from the power cylinder 36. Thus, the lower cylinder 36 is activated to assist the steerage of rear road wheels RW1, RW2.

When the steerage amount of front road wheels FW1, FW2 is small, the pulley 41 is rotated at a smaller angle than the predetermined angle. In this instance, the roller 53a of pin 53 may not be brought into engagement with the parallel side faces of radial groove 51a in rotary member 51. Thus, the output rotary member 52 does not act to transmit the torque of pulley 41 to the input shaft 81 of control valve 80, and the rear lateral rack bar 31 is retained in the neutral position under the biasing force of springs 37a, 37b in power cylinder 36. When the steerage amount of front road wheels FW1, FW2 is increased to rotate the pulley 41 at a larger angle than the predetermined angle, the roller 53a of pin 53 is pushed by engagement with one of the parallel side walls of radial groove 51a to rotate the output rotary member 52 with the input rotary member 52.

Assuming that the front road wheels FW1, FW2 have been steered in a rightward direction, the cable 34 is pulled forward to rotate the pulley 41 counterclockwisely. This causes the output rotary member 52 to rotate with the input rotary member 51. Thus, the support sleeve 64 is rotated with the output rotary member 52 by engagement with the axial pin 65 at its front end 64b, and in turn, the inner end of spiral spring 63 is rotated with the support sleeve 64 counterclockwisely. When the rear road wheels RW1, RW2 are conditioned to be freely steered on a normal road without any excessive load acting thereon in the steering direction, the spiral spring 63 acts to rotate the output rotary member 62 by engagement therewith at its outer end 63b. Such action is caused by the fact that the preload of spiral spring 63 is determined to be larger than a torque acting on the input and output rotary members 61 and 62 in accordance with the steerage of front road wheels FW1, FW2 during stopping or travel of the vehicle on the normal road. Thus, the output rotary member 62 causes the input rotary member 72 to rotate counterclockwisely, and in turn, the support sleeve 74 is rotated by engagement with the internal radial projection 71a of rotary member 71 at its front end 74b to rotate the inner end 73a of spiral spring 73 therewith. In this instance, the spiral spring 73 acts to rotate the output rotary member 72 by engagement therewith at its outer end 73b. The torque of output rotary member 72 is transmitted to the input shaft 81 of control valve 80 through the pin 42 and connecting sleeve 43. The torque from input shaft 81 is applied to the output pinion shaft 83 through the torsion bar 84 to cause axial displacement of the rear lateral rack bar 31 in the rightward direction. In this instance, the control valve 80 is operated to activate the power cylinder 36 in accordance with relative rotation of the input and output shafts 81 and 83. Thus, the rear road wheels RW1, RW2 are steered in the opposite direction relative to the front road wheels FW1, FW2, and the steering angle of rear road wheels RW1, RW2 is adjusted by the steering angle mechanism 50 as shown in FIG. 4.

When the rear road wheels RW1, RW2 are restricted by an excessive load acting thereon in the steering direction due to falling in a roadside gutter or abutment with a road shoulder, the axial displacement of rack bar 31 is restricted, and the rotary motion of output pinion shaft 83 is also restricted. In turn, the rotary motion of input shaft 81 is restricted by the output pinion shaft 83 through the stopper 87, and the rotary motion of output rotary member 72 is restricted through the connecting sleeve 43 and pin 42. If in such a condition the steering wheel 15 is turned to steer the front road wheels FW1, FW2, the input rotary member 71 and support sleeve 74 will be applied with the torque from the pulley 41 through the steering angle setting mechanism 50 and buffering mechanism 60 to rotate the inner end 73a of spiral spring 73 counterclockwisely. As the rotary motion of output rotary member 72 is being restricted, the outer end 73b of spiral spring 73 is retained in place by engagement with the projection 72b of output rotary member 72. As a result, the spiral spring 73 is wound radially inwardly by relative rotation of the input and output rotary members 71 and 72. When applied with the torque from pulley 41 through the input rotary member 61, the output rotary member 62 rotates at a smaller angle than that of the input rotary member 61 to restrict rotation of the outer end 63b of spiral spring 63. As a result, the spiral spring 63 is also wound radially inwardly by relative rotation of the input and output rotary members 61 and 62.

Assuming that the front road wheels FW1. FW2 have been steered to the left, the cable 35 is pulled forwardly by leftward displacement of the front rack bar 11 to rotate the pulley 41 clockwisely. This causes the input rotary member 61 to rotate clockwisely in FIG. 5, and in turn, the outer end 63b of spiral spring 63 is pushed by the projection 61a of input rotary member 61 to rotate in the same direction. When the rear road wheels RW1. RW2 are conditioned to be freely steered on a normal road without any excessive load acting thereon in the steering direction, the spiral spring 63 rotates clockwisely, and in turn, the inner end 63a of spiral spring 63 acts to rotate the internal radial projection 62a of output rotary member 62 through the support sleeve 64. This causes the output rotary member 62 to rotate in the same direction. In turn, the input rotary member 71 rotates with the output rotary member 62 clockwisely in FIG. 6, and the outer end 73b of spiral spring 73 is pushed by the axial projection 71b of input rotary member 71 to rotate in the same direction. Thus, the spiral spring 73 rotates clockwisely, and the inner end 73a of spiral spring 73 acts to rotate the internal radial projection of output rotary member 72 through the support sleeve 74. This causes the output rotary member 72 to rotate clockwisely. The torque of output rotary member 72 is transmitted to the input shaft 81 of control valve 80 through the pin 42 and connecting sleeve 43. The torque from input shaft 81 is applied to the output pinion shaft 83 through the torsion bar 84 to cause axial displacement of the rear lateral rack bar 31 in the leftward direction. In this instance, the control valve 80 is operated to activate the power cylinder 36 in accordance with relative rotation of the input and output shafts 81 and 83. Thus, the rear road wheels RW1, RW2 are steered in the opposite direction relative to the front road wheels FW1, FW2, and the steering angle of rear road wheels RW1, RW2 is adjusted by the steering angle setting mechanism 50 as shown in FIG. 4.

If the front road wheels FW1, FW2 are steered in a condition where the rear road wheels RW1. RW2 are in abutment with a road shoulder and fall in a roadside gutter, the rotary motion of output rotary member 72 in buffering mechanism 70 will be restricted by the stopper 87 of control valve 80. If in such a condition the steering wheel 15 is turned to steer the front road wheels FW1, FW2, the input rotary member 71 is applied with the torque from pulley 41 through the steering angle setting mechanism 50 and buffering mechanism 60 to rotate the outer end of spiral spring 73 clockwisely. As the rotary motion of output rotary member 72 is being restricted, the support sleeve 74 is retained in place by engagement with the internal radial projection 72a of output rotary member 27 to retain the inner end 73a of spiral spring 73 in place. As a result, the spiral spring 73 is wound radially inwardly by relative rotation of the input and output rotary members 71 and 72. When applied with the torque from pulley 41 through the input rotary member 61, the output rotary member 62 rotates at a smaller angle than that of the input rotary member 61 to restrict rotation of the inner end 63a of spiral spring 63. As a result, the spiral spring 63 is also wound radially inwardly by relative rotation of the input and output rotary members 61 and 62.

From the above description, it will be understood that relative rotation between the output rotary member 52 and the input shaft 81 is absorbed by resiliency of the spiral springs 63, 73 to restrain the tension acting on the cables 34, 35 less than a resultant force of the preloads and reaction forces of spiral springs 63, 73. With such an arrangement of the spiral springs 63, 73, the cables 34, 35 will be protected from disconnection even if the front road wheels FW1, FW2 are steered in a condition where the rear road wheels RW1, RW2 are in abutment with a road shoulder or fall in a roadside gutter. Additionally, the component parts of the displacement transmitting mechanism B1 are protected from damage caused an excessive load acting thereon.

Figure 7:
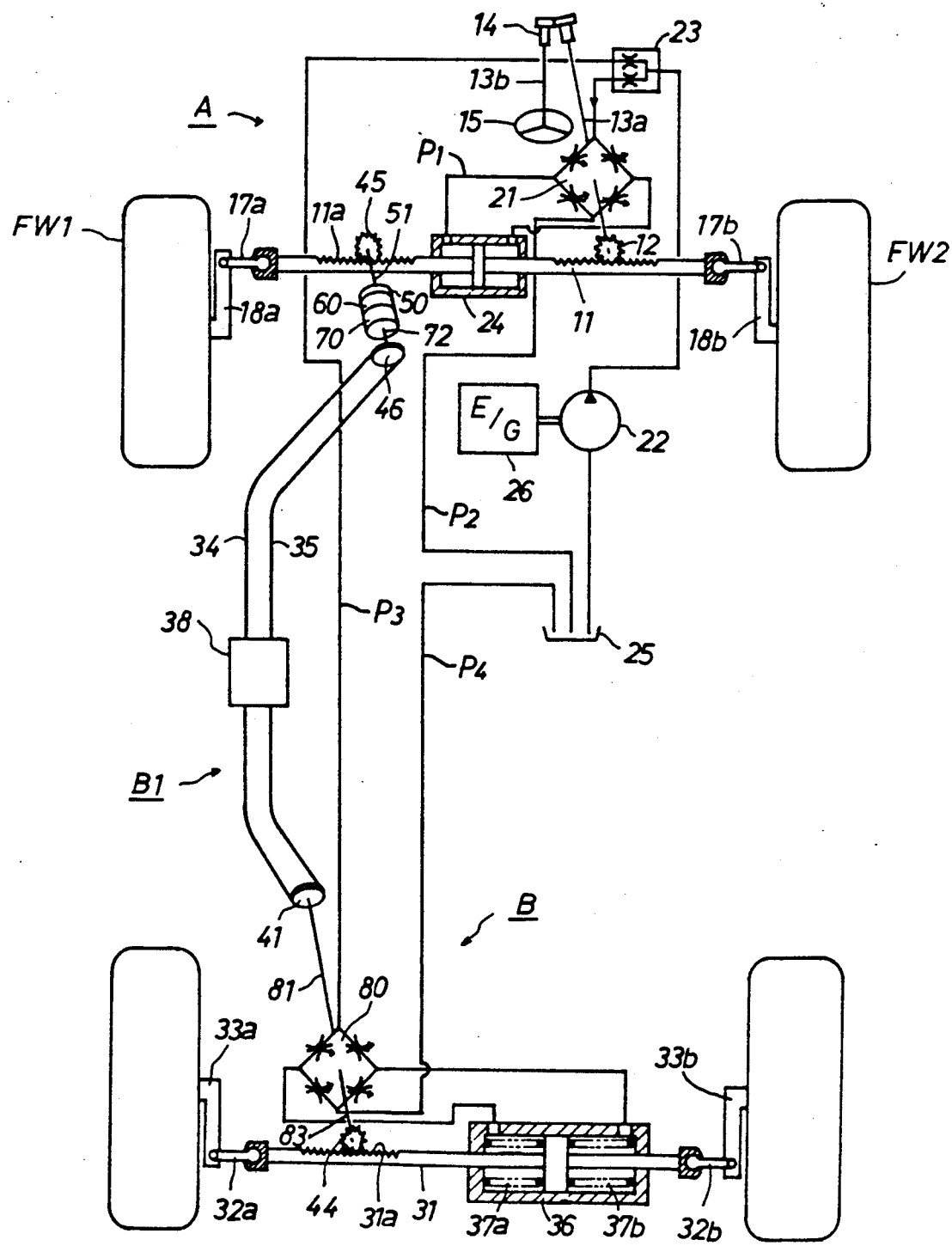
FIG. 7 is a schematic plan view of an automotive vehicle equipped with another embodiment of the present invention.
Figure 8:
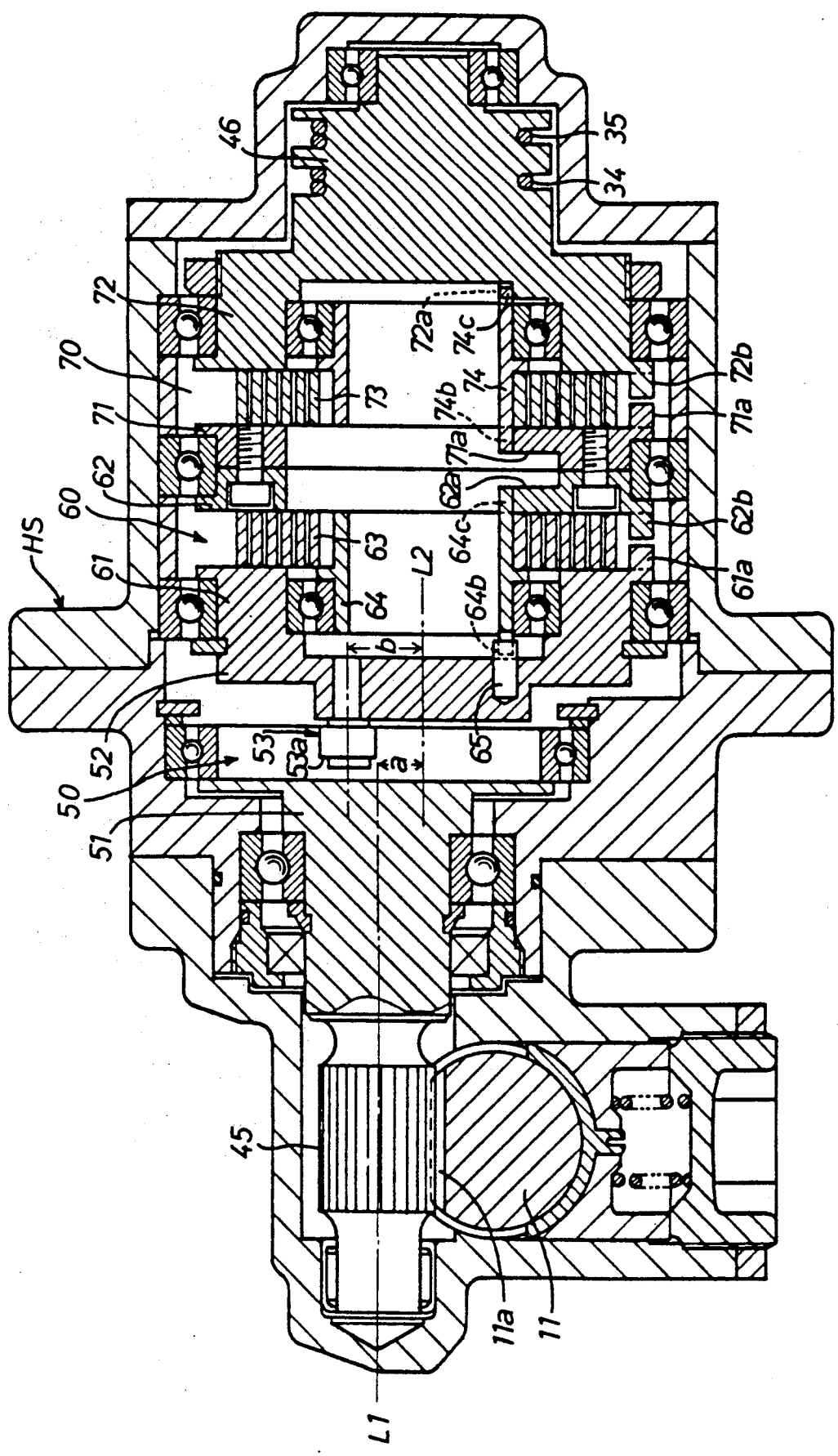
FIG. 8 is an enlarged sectional view of a displacement transmitting mechanism shown in FIG. 7.

In FIG. 7 there is illustrated a modification of the four-wheel steering system shown in FIG. 1, wherein the pulley 41 is arranged in direct connection to the input shaft 81 of control valve 80, and wherein the steering angle setting mechanism 50 and buffering mechanisms 60, 70 are operatively connected to the front lateral rack bar 11. As shown in FIGS. 7 and 8, the front lateral rack bar 11 has a toothed portion 11a in mesh with a pinion 45 which is integrally provided on the input rotary member 51 of steering angle setting mechanism 50. In operation, the input rotary member 51 is rotated in response to axial displacement of the rack bar 11, and in turn, the torque of input rotary member 51 is transmitted to the output rotary member 72 of buffering mechanism 70 through the steering angle setting mechanism 50 and buffering mechanism 60. The output rotary member 72 is integrally formed with a pulley 46 to which the cables 34, 35 are connected at their front ends to be wound around the pulley 46. Other construction and component parts are substantially the same as those of the steering system shown in FIGS. 1 and 2.

Assuming that the pinion 45 has been rotated in response to axial displacement of the front lateral rack bar 11 in a condition where the rear road wheels RW1, RW2 are located to be freely steered on a normal road, the torque of pinion 45 is transmitted to the input shaft 81 of control valve 80 through the steering angle setting mechanism 50, buffering mechanisms 60, 70, pulley 46, cable 34 or 35 and pulley 41. Thus, the rear lateral rack bar 31 is axially displaced to steer the rear road wheels RW1, RW2, and the power cylinder 36 is activated under control of the control valve 80 to assist the axial displacement of rack bar 31. In a condition where the rear road wheels RW1, RW2 are in abutment with a road shoulder or fall in a roadside gutter, the axial displacement of rear lateral rack bar 31 is restricted by the load acting on the rear road wheels, and in turn, the rotary motion of output rotary member 72 is restricted by the rear lateral rack bar 31 through the pulley 41, cable 34 or 35 and pulley 46. If in such a condition the steering wheel 15 is turned to steer the front road wheels FW1, FW2, the spiral springs 73 and 63 are wound radially inwardly in accordance with relative rotation between the input and output rotary members 71, 72 and between the input and output rotary members 61, 62 in such a manner as described in detail above. In this instance, a difference in steering amount between the front and rear road wheels is absorbed by the difference in rotation between the input and output rotary members 61 and 72. Thus, the force acting on the displacement transmitting mechanism B1 is restrained less than the resultant force of the preloads and reaction forces of spiral springs 63 and 73.

Figure 9:
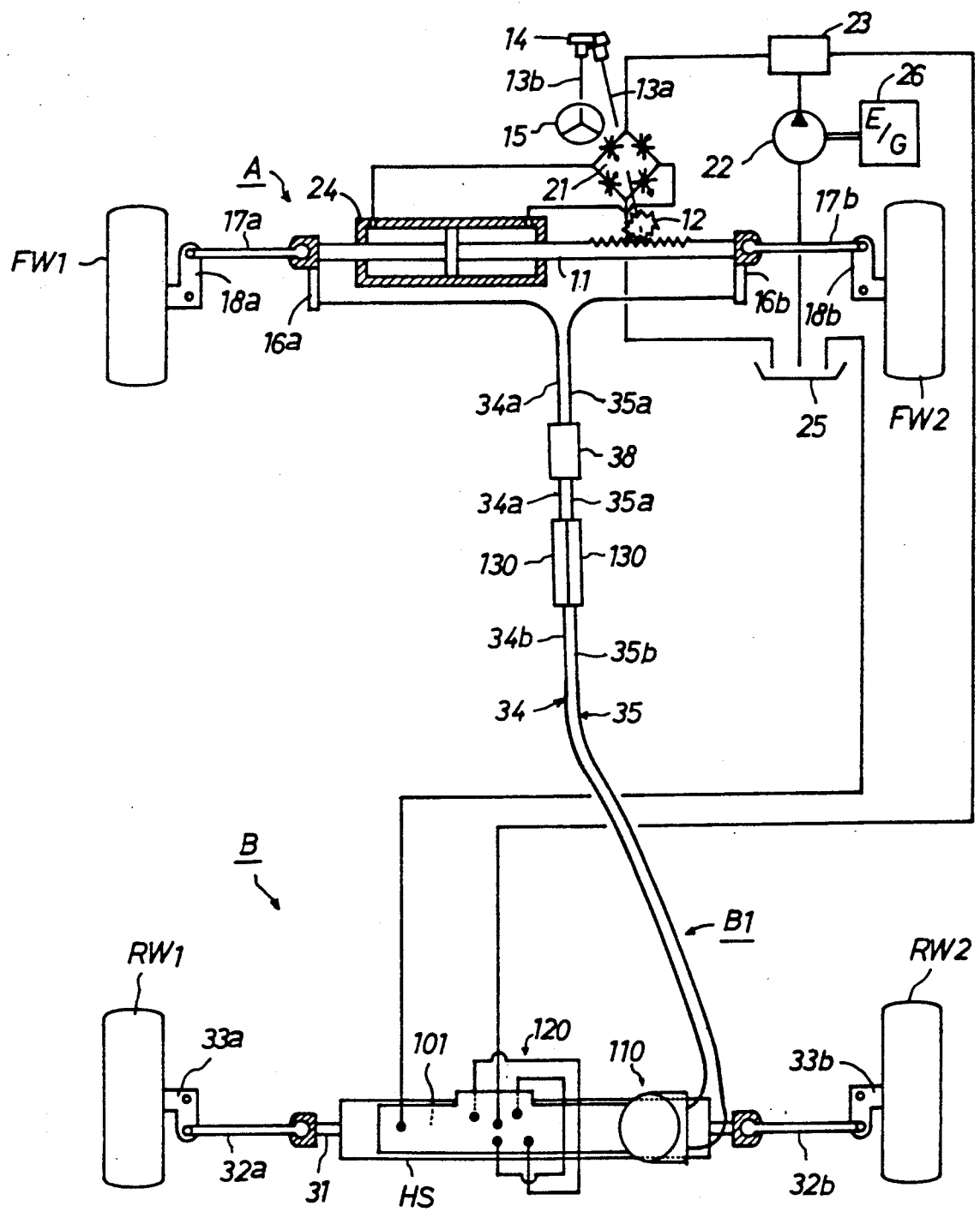
FIG. 9 is a schematic plan view of an automotive vehicle equipped with a further embodiment of the present invention.
Figure 10:
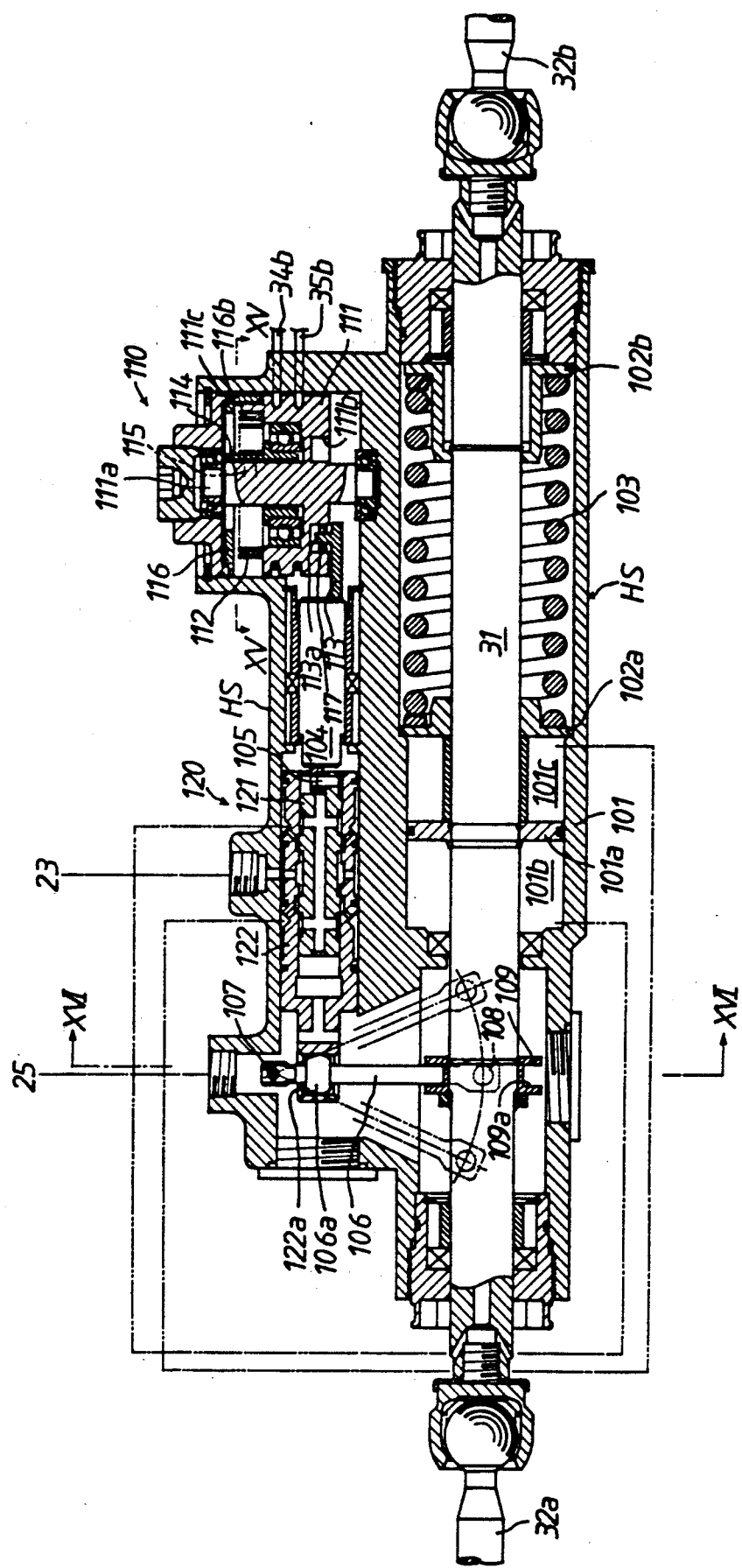
FIG. 10 is an enlarged sectional view of a power cylinder, a steering angle setting mechanism and a control valve assembly shown in FIG. 9.

In FIG. 9 there is illustrated another embodiment of the present invention the four-wheel steering system of which includes the substantially same front and rear wheel steering mechanisms A and B as those in the steering system shown in FIG. 1. In the steering system of FIG. 9, the rear wheel steering mechanism B includes a rear lateral rod 31 which corresponds with the rear lateral rack bar shown in FIG. 1. The rear lateral rod 31 is operatively connected to the front wheel steering mechanism A through cables 34, 35, a steering angle setting mechanism 110 and a control valve assembly 120. The rear lateral rod 31 is provided thereon with a power cylinder 101 which is integrally formed with a housing HS. As shown in FIG. 10, the housing HS is formed to contain therein the steering angle setting mechanism 110 and the control valve assembly 120. The power cylinder 101 includes a power piston 101a axially slidably disposed within a lower portion of housing HS to form a pair of fluid chambers 101b and 101c. The power piston 101a is fixed to the rear lateral rod 31 and is loaded toward a neutral position by means of a coil spring 103 which is assembled in surrounding relationship with the lateral rod 31 in the right-hand fluid chamber 101c and supported in place by engagement with a pair of axially spaced annular retainers 102a, 102b. The left-hand annular retainer 102a is retained in place by engagement with an internal annular shoulder of housing HS and is engaged with the power piston 101a through a sleeve member in such a manner as to permit leftward movement of the lateral rod 31. The right-hand annular retainer 102b is retained in place by engagement with the inner end of a closure plug threaded into an end portion of housing HS and is engaged with a snap ring fixed to the lateral rod 31 in such a manner as to permit rightward movement of the lateral rod 31.

The cables 34, 35 are subdivided into a pair of front cable sections 34a, 35a and a pair of rear cable sections 34b, 35b. The front cable sections 34a, 35a are connected at their forward ends to the rack ends 16a, 16b of front lateral rack bar 11 through the length adjuster 38, while the rear cable sections 34b, 35b are connected at their rearward ends to the steering angle setting mechanism 110. Disposed between the front and rear cable sections 34a, 35a and 34b, 35b is a pair of buffering mechanisms 130. As shown in FIGS. 11-13, the buffering mechanisms 130 each includes a casing 132 of U-letter shaped cross-section securedly coupled with a bottom plate 131 of rectangular in shape. The casing 132 is mounted in an appropriate manner on a vehicle body structure (not shown) in a fore-and-aft direction. The bottom plate 131 is provided thereon with a lower rail 131a, while the casing 132 is provided therein with an upper rail 132a which is arranged in parallel with the lower rail 131a. A cylindrical guide member 133 is axially slidably disposed within the casing 131 and has a pair of parallel guide grooves 133a and 133b which are slidably engaged with the lower and upper rails 131a and 132a. The cylindrical guide member 133 contains therein a pair of axially spaced end plates 134 and 135 and a preloaded coil spring 136 disposed between the end plates 134 and 135. Under the biasing force of spring 136, the end plate 134 is retained in engagement with an annular flange 133c formed at the rear end of cylindrical guide member 133, while the end plate 135 is retained in engagement with a stopper plate 137 threaded into the front end of cylindrical guide member 133.

The front cable section 34a is introduced into the casing 132 through a front end wall 131b of bottom plate 131 and extended rearward through the stopper plate 137 and end plates 135, 134, while the rear cable section 34b is introduced into the casing 132 through a rear end wall 131c of bottom plate 131 and extended forward through the end plates 134, 135. The end plate 134 is adapted as an input member of the buffering mechanism 130 and receives an end metal 138 fixed to the rear end of front cable section 34a. Thus, the end plate 134 acts to pull the front cable section 34a rearward when it has been pulled forward against the biasing force of spring 136. The end plate 135 is adapted as an output member of the buffering mechanism 130 and receives an end metal 139 fixed to the front end of rear cable section 34b. Thus, the end plate 135 acts to pull the rear cable section 34b forward when it has been pulled rearward against the biasing force of spring 136. The front and rear cable sections 35a, 35b are assembled with the other buffering mechanism 130 in the same manner as described above.

Figure 14:
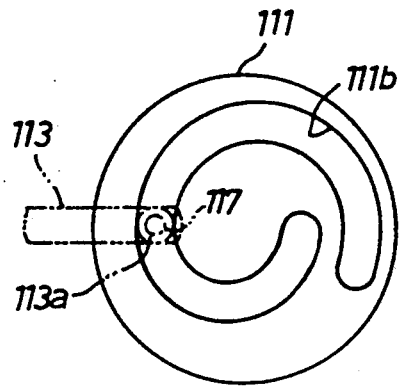
FIG. 14 is an enlarged plan view of a cam plate shown in FIG. 10.
Figure 15:
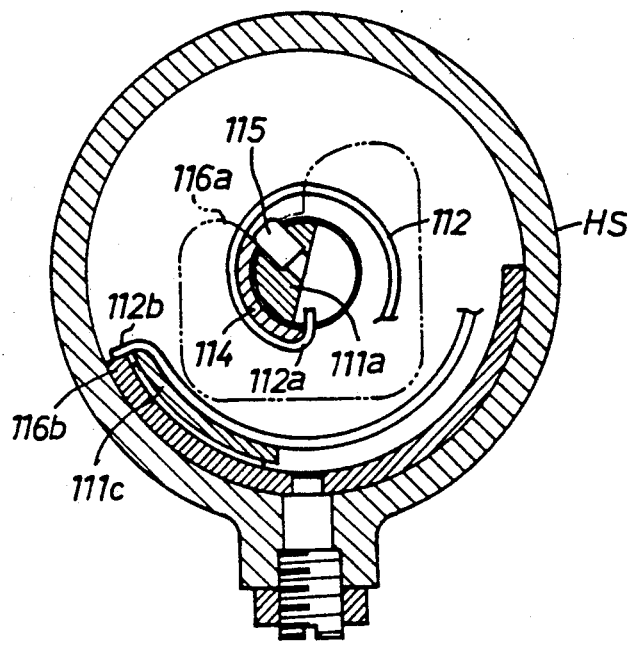
FIG. 15 is an enlarged cross-sectional view taken along line XV—XV in FIG. 10.

As shown in FIG. 10, the steering angle setting mechanism 110 includes a cam plate 111, a spiral spring 112 and a connecting rod 113. The cam plate 111 has a support shaft 111a which is rotatably mounted within an upper portion of housing HS by means of a pair of axially spaced ball bearings. As shown in FIG. 14, the cam plate 111 is formed at its bottom face with a spiral cam groove 111b and connected at its outer periphery to the rear ends of rear cable sections 34b, 35b. The spiral spring 112 is mounted on the cam plate 111 in a preloaded condition to bias the cam plate 111 toward a neutral position. As shown in FIGS. 10 and 15, the spiral spring 112 is engaged at its inner end 112a with a collar 114 which is rotatably coupled with the support shaft 111a and engaged with a radial pin 115 fixed to support shaft 111a. The collar 114 is further engaged with an internal projection 116a of a cover member 116 fixed to the upper portion of housing HS. The outer end 112b of spiral spring 112 is engaged with a semi-circular projection 111c formed on the cam plate 111 and a lower projection 116b of cover member 116. As shown in FIGS. 10 and 14, the connecting rod 113 is provided at its one end with a cam pin 113a which is engaged with the spiral cam groove 111b through a ball bearing 117. The connecting rod 113 is connected at its other end to a plunger 104 which is axially movably disposed within the upper portion of housing HS and connected to a valve spool 121 of control valve assembly 120 by means of a pin 105.

The control valve assembly 120 includes a valve sleeve 122 axially slidably disposed within the upper portion of housing HS coaxially with the plunger 104. The valve spool 121 is axially slidably disposed within the valve sleeve 122 and cooperates with the valve sleeve 122 to selectively supply the hydraulic fluid under pressure into the fluid chambers 101a and 101b of power cylinder 101 from the flow dividing valve 23.

Figure 16:
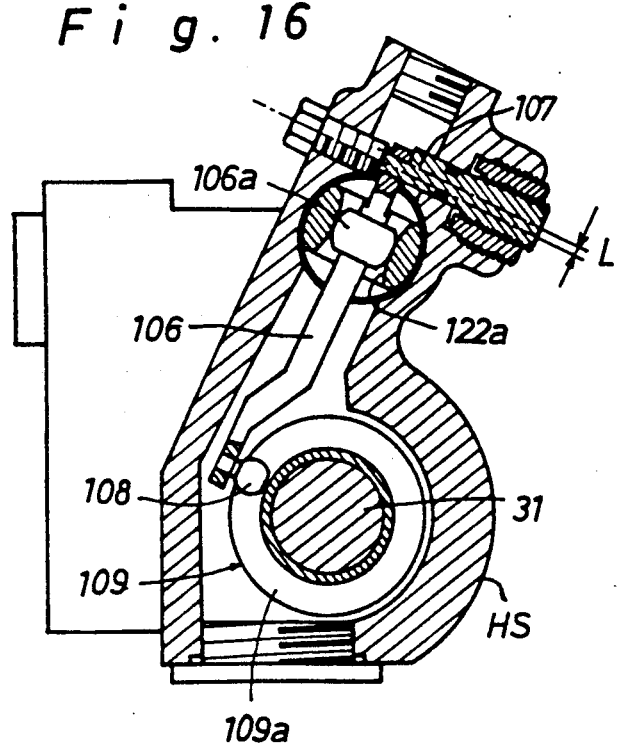
FIG. 16 is an enlarged cross-sectional view taken along line XVI—XVI in FIG. 10.

Provided between the valve spool 121 and valve sleeve 122 is a stopper (not show) which acts to restrict relative displacement of the valve spool 121 and sleeve 122. The valve sleeve 122 is operatively connected at its left end to the rear lateral rod 31 by means of a swingable lever 106. As shown in FIGS. 10 and 16, the swingable lever 106 is rotatably supported at its upper end by means of a support pin 107 to be swung leftward or rightward in response to axial displacement of the rear lateral rod 31. As shown in FIG. 16, the support pin 107 is threaded into an adjustable fastening nut which is threaded into the upper portion of housing HS. The fulcrum of swingable lever 106 is displaced in a distance L from the rotation center of support pin 107. The swingable lever 106 has an enlarged pivot portion 106a formed with a spherical surface for engagement with a corresponding bore 122a in the left end portion of valve sleeve 122. A pin 108 fixed to the lower end of swingable lever 106 is engaged with an annular groove 109a of an annular member 109 fixed to the rear lateral rod 31.

Hereinafter, the operation of the four-wheel steering system will be described in detail. Assuming that the steering wheel 15 is turned to steer the front road wheels FW1, FW2, either one of the front cable sections 34a and 35a is pulled forward in accordance with axial displacement of the front lateral rack bar 11. Thus, the end plate 134 in either one of the buffering mechanisms 130 is pulled forward to move the end plate 135 and stopper plate 137 forwardly through the spring 136. In a condition where the rear road wheels RW1, RW2 are located to be freely steered on a normal road, the spring 136 is moved forward without any deflection to cause forward movement of the cylindrical guide member 133 along rails 131a, 132a. As a result, either one of the rear cable sections 34b and 35b is pulled forward to rotate the cam plate 111 in steering angle setting mechanism 110, while the other rear cable section is pulled rearward by rotation of the cam plate 111 to cause rearward movement of the cylindrical guide member 133 in the other buffering mechanism 130.

During rotation of the cam plate 111, the cam pin 117 is moved along the cam groove 113a to cause axial displacement of the connecting rod 113. In turn, the plunger 104 is moved by the connecting rod 113 forward or rearward to cause axial displacement of the valve spool 121. Thus, the valve spool 121 cooperates with the valve sleeve 122 to selectively supply the hydraulic fluid under pressure from flow dividing valve 23 into either one of the fluid chambers 101b, 101c in power cylinder 101 and to permit the hydraulic fluid discharged from the other fluid chamber. Under such control of the control valve 120, the power cylinder 101 is activated to cause axial displacement of the rear lateral rod 31 to steer the rear road wheels RW1, RW2. Subsequently, the axial displacement of lateral rod 31 causes the swingable lever 106 to swing leftward or rightward about the support pin 107, and in turn, the valve sleeve 122 is displaced rightward or leftward to block the supply of hydraulic fluid under pressure into the power cylinder 101 and to block the discharge of hydraulic fluid from the power cylinder 101. As a result, the power cylinder 101 is deactivated to retain the lateral rod 31 in its displaced position thereby to arrest the steerage of rear road wheels RW1, RW2.

As is understood from the above description, the cable 35 is pulled forward when the front road wheels FW1, FW2 are steered to the right. In this instance, the cam plate 111 rotates to displace the valve spool 121 rightward. When the front road wheels FW1, FW2 are steered to the left, the cable 34 is pulled forward to rotate the cam plate 111 thereby to displace the valve spool 121 leftward. Thus, the rear road wheels RW1, RW2 are steered in the opposite direction relative to the front road wheels FW1, FW2, and the steerage amount of rear road wheels RW1, RW2 is determined by the configuration of cam groove 111b.

In a condition where the rear road wheels RW1, RW2 are in abutment with a road shoulder or fall in a roadside gutter, axial displacement of the rear lateral rod 31 is restricted by the load acting on the rear road wheels, and in turn, axial displacement of the valve sleeve 122 is restricted by the lateral rod 31 through the swingable lever 106. Thus, axial displacement of the valve spool 121 is restricted by engagement with the valve sleeve 122 through the stopper (not shown) to retain the rear cable sections 34b, 35b in place. If in such a condition either one of the front cable sections 34a, 35a is pulled forward by axial displacement of the front lateral rack bar 11 in steering operation of the front road wheels, the end plate 134 in either one of the buffering mechanisms 130 is moved against the spring 136, while the end plate 135 is retained in place. In this instance, the spring 136 acts to absorb a difference in displacement between the front and rear cable sections 34a, 34b or 35a, 35b. This is useful to eliminate an excessive load acting on the cables 34, 35 and the component parts of the steering angle setting mechanism 110.

Figure 17:
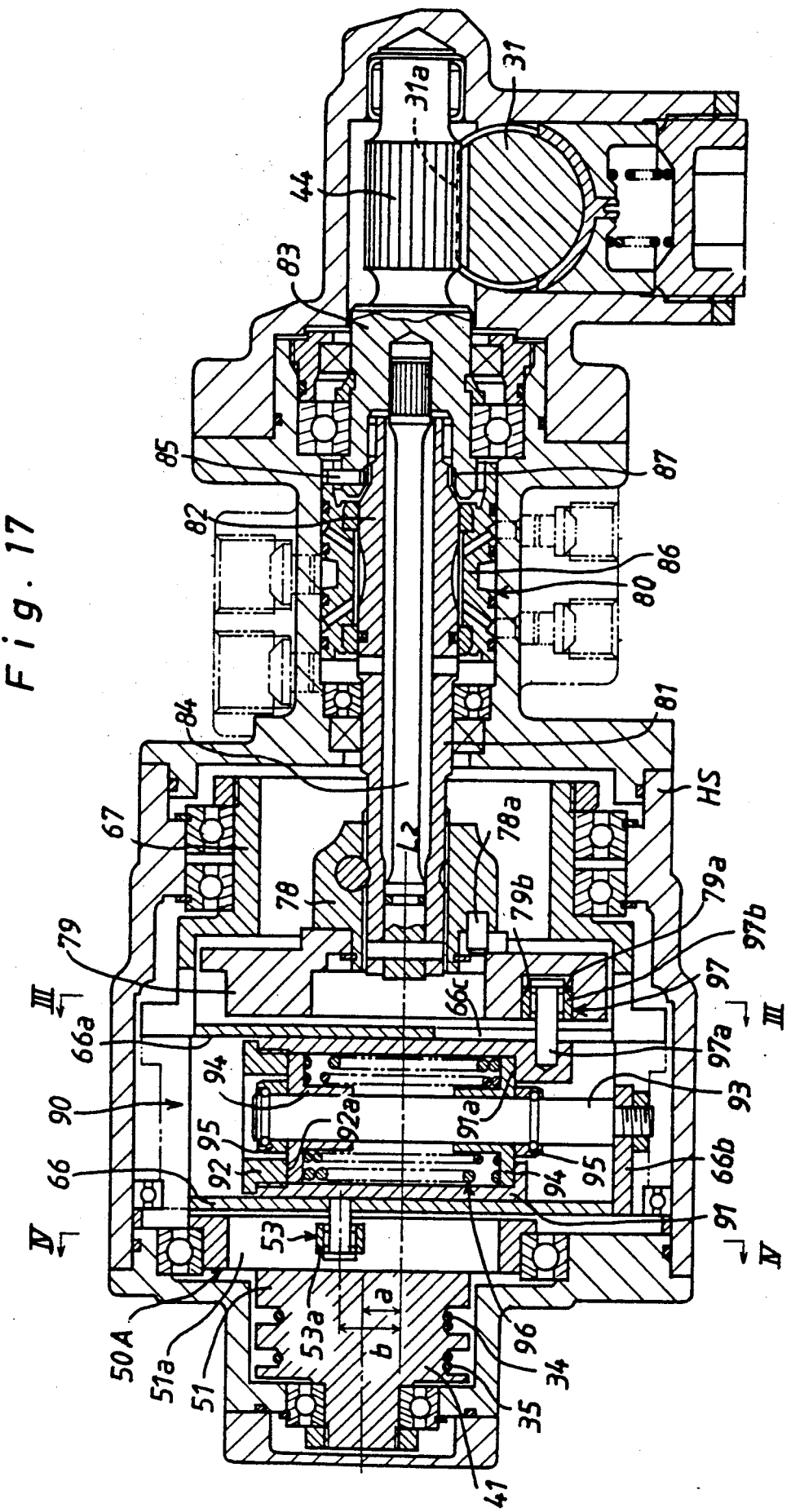
FIG. 17 is a sectional view of a modification of the displacement transmitting mechanism shown in FIG. 2.
Figure 18:
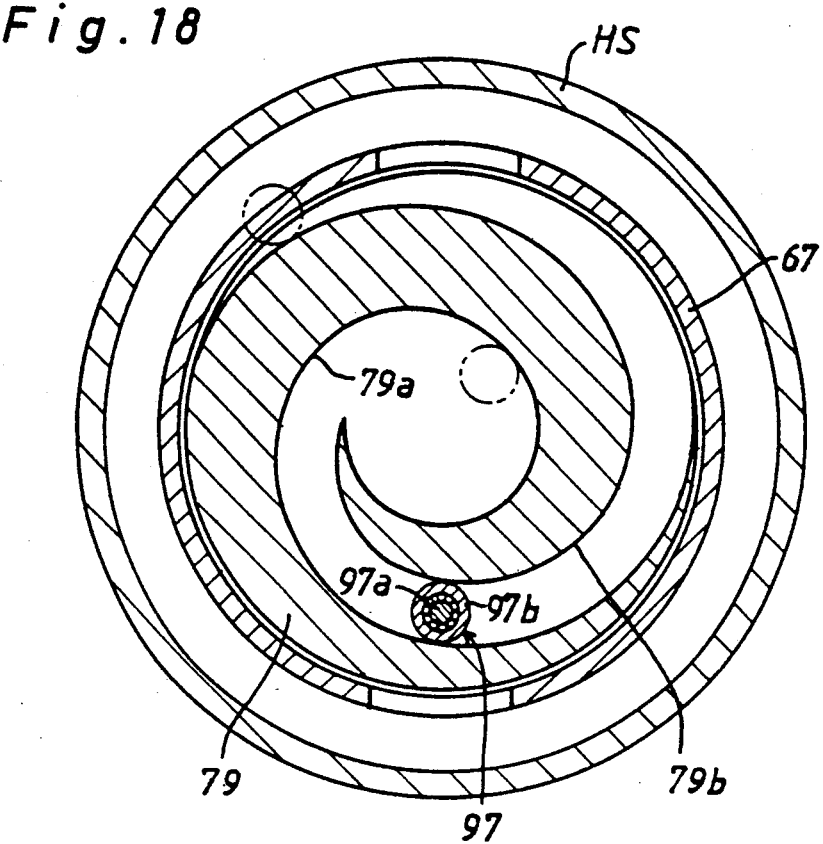
FIG. 18 is an enlarged cross-sectional view taken along line III—III in FIG. 17.
Figure 19:
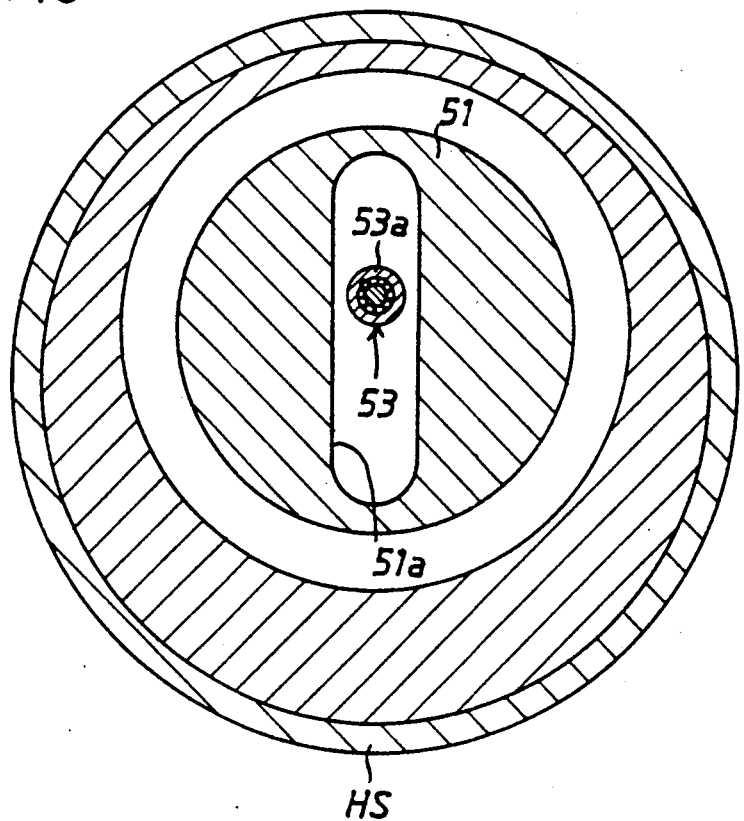
FIG. 19 is an enlarged cross-sectional view taken along line IV—IV in FIG. 17.

In FIG. 17 there is illustrated a modification of the displacement transmitting mechanism shown in FIG. 2, wherein the same component parts and portions as those of the transmitting mechanism are indicated by the same reference numerals shown in FIG. 2. In this modification, an input rotary member 66 is rotatably mounted within the housing HS and connected at its rear end to a cylindrical support member 67 which is rotatably mounted within the housing HS coaxially with the input rotary member 66. The input rotary member 66 has a radial bore 66a formed therein for containing a buffering mechanism 90. The eccentric pin 53 is fixed to the input rotary member 66, and the roller 53a of pin 53 is contained in the radial groove 51a formed in the rear end of input rotary member 51 as shown in FIG. 19. Thus, a steering angle setting mechanism 50A is composed of the input rotary member 51 cooperable with the roller 53a of eccentric pin 53. The buffering mechanism 90 includes a cylindrical slider 91 slidable in the radial bore 66a of input rotary member 66, a stopper plug 92 threaded into one end of slider 91, a guide rod 93 arranged coaxially within a bore of slider 91 and fixed at its one end to a flange 66b of rotary member 66, and coaxial coil springs 96 arranged in surrounding relationship with the guide rod 93 and disposed between a pair of axially spaced movable retainers 94. One of the retainers 94 is engaged with the inner end face 92a of stopper plug 92 and the other retainer 94 is engaged with an annular bottom shoulder 91a of slider 91. In such a manner, the coil springs 96 are applied with a preload in a free condition. The guide rod 93 has a pair of axially spaced ring stoppers 95 fixed thereon and being maintained in engagement with the retainers 94. In the above arrangement, the slider 91 is resiliently supported by the guide rod 93 and retained in a neutral position under the biasing force of springs 96. When applied with a thrust force larger than the preload of springs 96, the slider 91 is displaced against the springs 96.

In the buffering mechanism 90, a cam follower pin 97a is fixed to a rear portion of slider 91 and extended rearward through a radial slit 66c of rotary member 66 to restrict rotation of the slider 91. The cam follower pin 97a is provided thereon with a roller 97b which is engaged with spiral cam faces 79a, 79b formed in an output rotary member 79. Thus, a cam follower 97 is composed of the cam follower pin 97a and roller 97b. The output rotary member 79 is mounted on a support member 78 which is splined to the input shaft 81 of control valve 80. The output rotary member 79 is connected to the support member 78 by means of a pin 78a for rotation therewith. The spiral cam faces 79a, 79b are in the form of Archimedean screw surfaces. Assuming that the output rotary member 79 is retained in place during clockwise rotation of the input rotary member 66 in steering operation of the front road wheels, the cam follower 97 is guided by the spiral cam surface 79a to displace the slider 91 upward in the figure against the springs 96. During counterclockwise rotation of the input rotary member 66, the cam follower 97 is guided by the spiral cam surface 79b to displace the slider 91 downward in the figure against the springs 96.

Hereinafter, the operation of the displacement transmitting mechanism of FIG. 17 will be described in detail. Assuming that the steering wheel 15 is turned to steer the front road wheels, either one of the cables 34 and 35 is pulled forward in accordance with axial displacement of the front lateral rack bar 11 to rotate the pulley 41 clockwisely or counterclockwisely. In a condition where the rear road wheels are located to be freely steered on a normal road, the torque of pulley 41 is transmitted to the input rotary member 66 through the steering angle setting mechanism 50A and applied to the output rotary member 79 without causing any compression of the springs 96 in buffering mechanism 90. The torque of output rotary member 79 is transmitted to the input shaft 81 of control valve 81 through the support member 78. The torque from input shaft 81 is applied to the output pinion shaft 83 through the torsion bar 84 to cause axial displacement of the rear lateral rack bar 31. In this instance, the control valve 80 is operated to activate the power cylinder 36 in accordance with relative rotation of the input and output shafts 81 and 83. Thus, the rear road wheels RW1, RW2 are steered in the opposite direction relative to the front road wheels FW1, FW2, and the steering angle of rear road wheels RW1, RW2 is adjusted by the steering angle setting mechanism 50A as shown in FIG. 4.

In a condition where the rear road wheels are restrained by an excessive load acting thereon in the steering direction due to falling in a roadside gutter or abutment with a road shoulder, the rotary motion of output rotary member 79 is restricted by the load applied thereto through the rear lateral rack bar 31 and control valve 80. If in such a condition the steering wheel 15 is turned to steer the front road wheels FW1, FW2, the input rotary member 66 will be applied with the torque from pulley 41 through the the steering angle setting mechanism 50A to rotate clockwisely or counterclockwisely. In this instance, the cam follower 97 acts to compress the springs 96 in accordance with relative rotation between the input and output rotary members 66 and 79. Thus, the torque applied to input rotary member 66 is absorbed by the compression of springs 96 to eliminate an excessive tension acting on the cable 34 or 35 during steering operation of the front road wheels.

Figure 20:
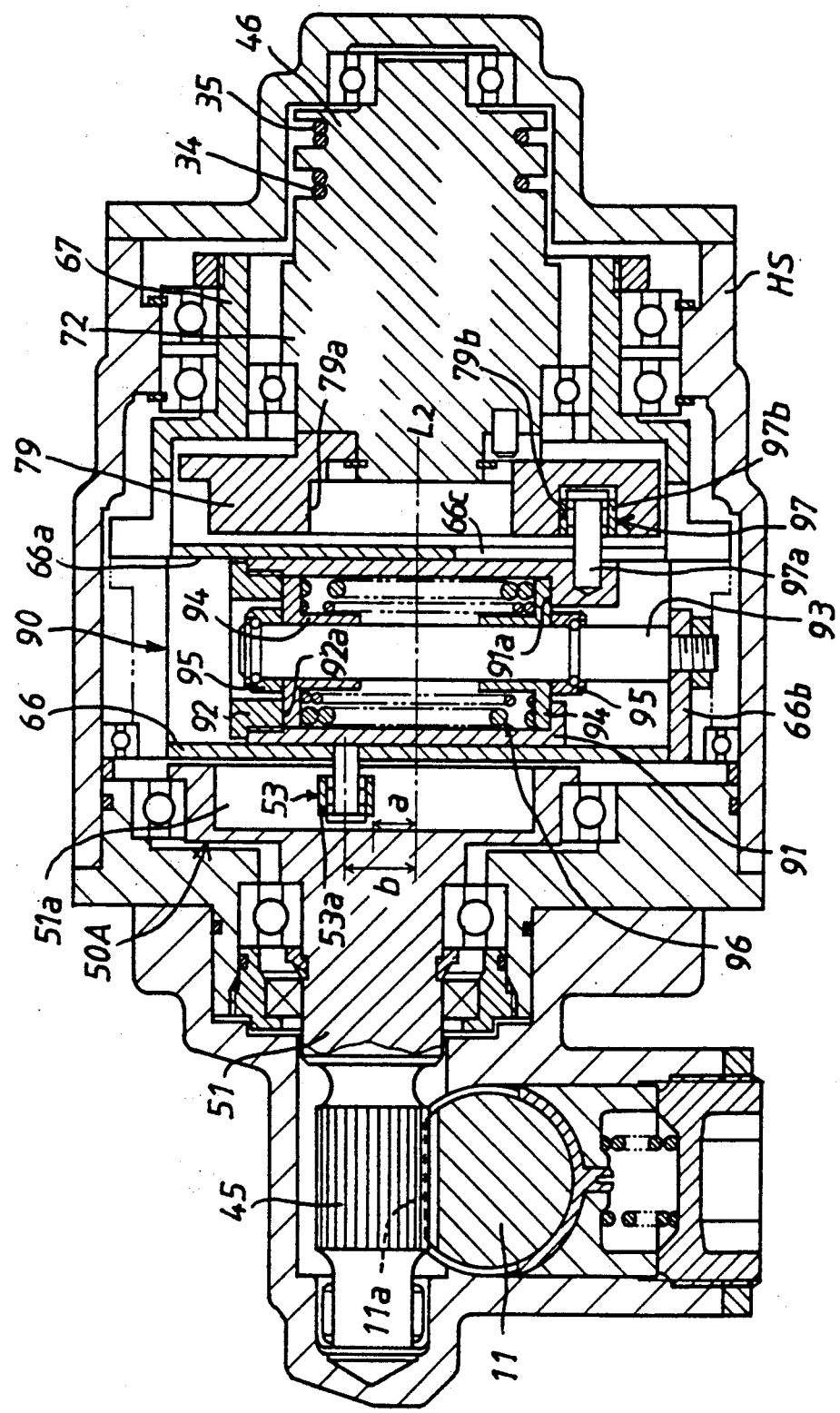
FIG. 20 is a sectional view of a modification of the displacement transmitting mechanism shown in FIG. 8.

In FIG. 20 there is illustrated a modification of the displacement transmitting mechanism shown in FIG. 8, wherein the same component parts and portions as those of the transmitting mechanism are indicated by the same reference numerals shown in FIG. 8, and wherein the same steering angle setting mechanism 50A and buffering mechanism 90 as those shown in FIG. 17 are assembled between the input and output rotary members 51 and 72. Assuming that in this modification the pinion 45 has been rotated in response to axial displacement of the front lateral rack bar 11 in a condition where the rear road wheels are located to be freely steered on a normal load, the torque of pinion 45 is transmitted to the input shaft 81 of control valve 80 through the steering angle setting mechanism 50A, buffering mechanism 90, pulley 46, cable 34 or 35 and pulley 41. Thus, the rear lateral rack bar 31 is axially displaced to steer the rear road wheels, and the power cylinder 36 is activated under control of the control valve 80 to assist the axial displacement of rack bar 31. In a condition where the rear road wheels are in abutment with a road shoulder or fall in a roadside gutter, the rotary motion of pulley 46 is restricted by an excessive load acting thereon through the rear lateral rack bar 31, control valve 80, pulley 41 and cable 34 or 35. If in such a condition the steering wheel 15 is turned to steer the front road wheels FW1, FW2, the input rotary member 66 will be applied with the torque from input rotary member 51 throught the steering angle setting mechanism 50A to rotate clockwisely or counterclockwisely. In this instance, the cam follower 97 acts to compress the springs 96 in accordance with relative rotation between the input and output rotary members 66 and 79. Thus, the torque applied to the input rotary member 66 is absorbed by the compression of springs 96 to eliminate an excessive load acting on the component parts of steering angle setting mechanism 50A and buffering mechanism 90 during steering operation of the front road wheels.

Figure 21:
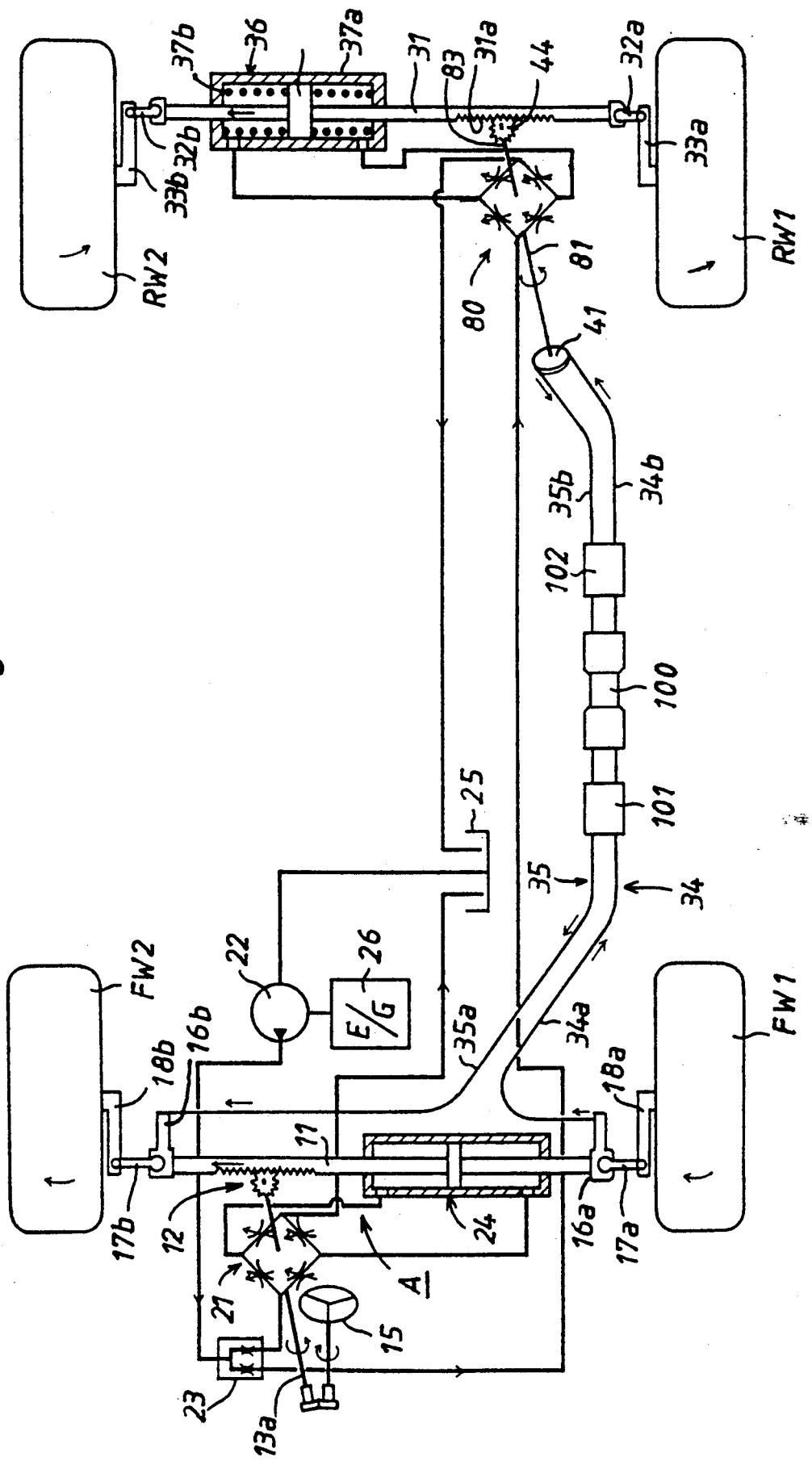
FIG. 21 is a schematic plan view of an automotive vehicle equipped with a further embodiment of the present invention.

In FIG. 21 there is illustrated a further embodiment of the present invention the four-wheel steering system of which includes the substantially same front and rear wheel steering mechanisms A and B as those in the steering system shown in FIG. 1. In the steering system of FIG. 21, the rear lateral rod 31 is operatively connected to the front wheel steering mechanism A through a pair of cables 34, 35 and the control valve 80. The cables 34, 35 are subdivided into a pair of front cable sections 34a, 35a and a pair of rear cable sections 34b, 35b. The front cable sections 34a, 35a are connected at their forward ends to the rack ends 16a, 16b of front lateral rack bar 11 and at their rearward ends to a displacement transmitting mechanism 100 through a length adjuster 101, while the rear cable sections 34b, 35b are connected at their forward ends to the displacement transmitting mechanism 100 through a length adjuster 102 and at their rearward ends to the pulley 41 connected to the input shaft 81 of control valve 80.

Figure 22:
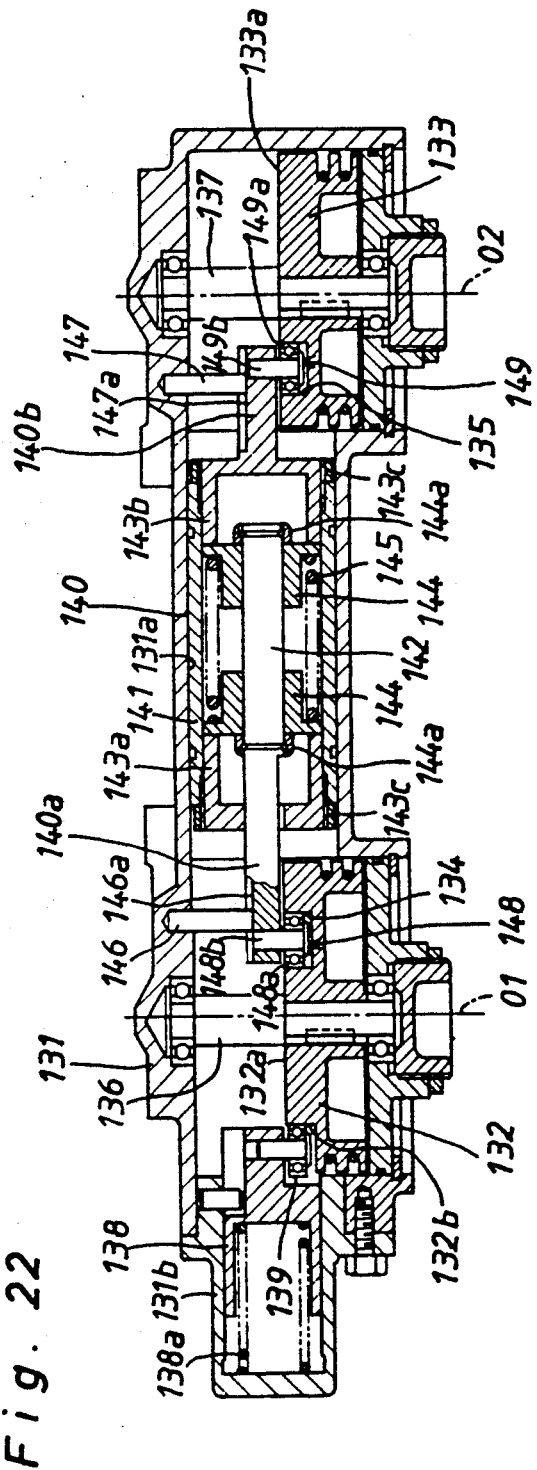
FIG. 22 is an enlarged vertical sectional view of a displacement transmitting mechanism shown in FIG. 21.
Figure 23:
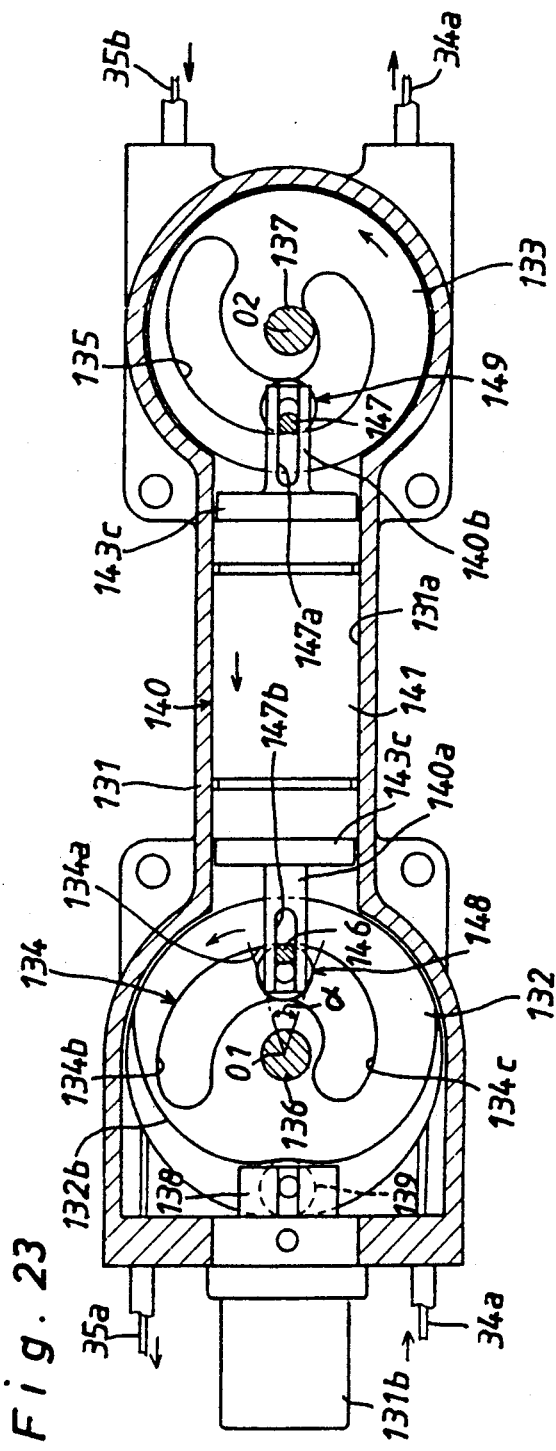
FIG. 23 is an enlarged sectional plan view of the displacement transmitting mechanism shown in FIG. 22.

As shown in FIGS. 22 and 23, the displacement transmitting mechanism 100 includes a casing 131, an input pulley 132 contained within a front portion of casing 131, an output pulley 133 contained within a rear portion of casing 131, and a buffuring mechanism 140 disposed between the input and output pulleys 132 and 133 in casing 131. The input and output pulleys 132 and 133 are fixed to a pair of axially spaced support shafts 136 and 137 which are rotatably mounted within the front and rear portions of casing 131 to rotate about vertical axes 01 and 02. The rearward ends of front cable sections 34a, 35a are wound around and connected to the input pulley 132, while the forward ends of rear cable sections 34b, 35b are wound around and connected to the output pulley 133. The input pulley 132 is formed at its outer periphery with a semi-circular cam surface 132b and formed at its upper face 132a with a semi-circular cam groove 134 which includes a central semi-circular groove part 134a and a pair of side groove parts 134b, 134c. The central semi-circular groove part 134 is formed in an angular extent $\alpha$ to be located symmetrically with respect to a plane between the vertical axes 01 and 02. The side groove part 134b is formed to be apart from the vertical axis 01, while the side groove part 134c is formed to approach toward the vertical axis 01. The output pulley 133 is formed at its upper face 133a with a semi-circular cam groove 135 the configuration of which is similar to that of the semi-circular cam groove 134. The casing 131 is unitedly provided at its front end with a cylindrical support member 131b which is positioned perpendicularly to the vertical axis 01. The support member 131b is formed to contain a slider 138 and a preloaded coil spring 138a therein. The slider 138 is axially inwardly loaded by the coil spring 138a toward the vertical axis 01. The slider 138 is provided at its inner end with a roller 139 which is engaged with the cam surface 132b of output pulley 132 under the load of coil spring 138a to retain the output pulley 132 in a neutral position.

The buffering mechanism 140 includes a cylindrical slider 141 axially slidably disposed within an intermediate bore 131a of casing 131, a support rod 142 coaxially arranged in the slider 141, a pair of axially spaced retainers 144 mounted on support rod 142, and a preloaded coil spring 145 disposed between the retainers 144. The retainers 144 are in engagement with a pair of axially spaced ring stoppers 144a fixed to the support rod 142. The left-hand retainer 144 is received by the inner end of a stopper plug 143a threaded into the left end of slider 141 and fastened in place by a lock nut 143c, while the right-hand retainer 144 is received by the inner end of a stopper plug 143b threaded into the right end of slider 141 and fastened in place by a lock nut 143c. The support rod 142 extends outwardly from the slider 141 through the left-hand stopper plug 143a to be located above the input pulley 132, while the right-hand stopper plug 143b is integrally formed with an axial projection 140b which is located above the output pulley 133. The outwardly extended portion 140a of support rod 142 is formed thereon with an axial guide groove 146a which is engaged with the lower end of a vertical guide pin 146 fixed to an upper portion of casing 131. The axial projection 140b of stopper plug 143b is formed thereon with an axial guide groove 147a which is engaged with the lower end of a verical guide pin 147 fixed to an upper portion of casing 131. The guide pins 146 and 147 act to restrict rotation of the slider 131. A cam follower pin 148b is fixed to the front end of support rod 142 and coupled within the cam groove 134 of input pulley 132 through a ball bearing 148a. Thus, an input cam follower 148 is composed of the cam follower pin 148b and ball bearing 148a. On the other hand, a cam follower pin 149b is fixed to the rear end of axial projection 140b and coupled within the cam groove 135 of output pulley 133 through a ball bearing 149a. Thus, an output cam follower 149 is composed of the cam follower pin 149b and ball bearing 149a.

Hereinafter, the operation of the four-wheel steering system of FIG. 21 will be described in detail. Assuming that the steering wheel 15 is turned to steer the front road wheels FW1, FW2, either one of the front cable sections 34a, 35a is pulled forward in accordance with axial displacement of the front lateral rack bar 11 to rotate the input pulley 132 counterclockwisely or clockwisely. Thus, the input cam follower 148 cooperates with the cam groove 134 of input pulley 132 to cause axial displacement of the slider 141, and in turn, the output cam follower 149 cooperates with the cam groove 135 of output pulley 133 to rotate the output pulley 133 in accordance with the axial displacement of slider 141.

In a condition where the rear road wheels RW1, RW2 are located to be freely steered on a normal road, the torque of input pulley 132 is transmitted to the output pulley 133 through the slider 141 without causing any compression of coil spring 145. In turn, the torque of output pulley 133 is transmitted to the input shaft 81 of control valve 80 through the rear cable section 34b or 35b and pulley 41. The torque from input shaft 81 is applied to the output pinion shaft 83 through the torsion bar 84 to cause axial displacement of the rear lateral rack bar 31. In this instance, the control valve 80 is operated to activate the power cylinder 36 in accordance with relative rotation of the input and output shafts 81 and 83. Thus, the rear road wheels RW1, RW2 are steered in the opposite direction relative to the front road wheels. If during steering operation of the front road wheels the input pulley 132 is rotated in the anglar extent $\alpha$, the input cam follower 148 does not cause any axial displacement of slider 141. As a result, the output pulley 133 is retained in the neutral position.

In a condition where the rear road wheels RW1, RW2 are restrained by an excessive load acting thereon in the steering direction due to falling in a roadside gutter or abutment with a road shoulder, the rotary motion of output pulley 133 is restricted by the load applied thereto through the rear lateral rack bar 31, control valve 80 and rear cable section 34b or 35b. If in such a condition the steering wheel 15 is turned to steer the front road wheels, the support rod 142 will be applied with the torque from input pulley 132 through the input cam follower 148. In this instance, the input cam follower 148 acts to compress the coil spring 145 in accordance with rotation of the input pulley 132. Thus, the torque applied to support rod 142 is absorbed by the compression of coil spring 145 to eliminate an excessive load acting on the cable 34 or 35 and control valve 80 during steering operation of the front road wheels.

Having now fully set forth both structure and operation of preferred embodiments of the concept underlying the present invention, various other embodiments as well as certain variations and modifications of the embodiments shown and described herein will obviously occur to those skilled in the art upon becoming familiar with said underlying concept. It is to be understood, therefore, that within the scope of the appended claims, the invention may be practiced otherwise than as specifically set forth herein.

What is claimed is:

1. A four-wheel steering system for an automotive vehicle, comprising a front wheel steering mechanism operable in response to a steering effort applied thereto to steer a set of dirigible front road wheels, a rear wheel steering mechanism arranged to steer a set of dirigible rear road wheel in response to steerage of the front road wheels, and a cable linkage operatively interconnecting said front and rear wheel steering mechanisms, wherein a displacement transmitting mechanism is provided on said cable linkage to transmit displacement of a front lateral bar in said front wheel steering mechanism to said rear wheel steering mechanism, said displacement transmitting mechanism including an input element operatively connected to said front lateral bar through said cable linkage, an output element operatively connected to said rear wheel steering mechanism, and resilient means disposed between said input and output elements to transmit displacement of said input element to said output element without any deflection in a condition where said output element is freely movable and to resiliently adsorb displacement of said input element in a condition where said output element is restrained by an excessive load applied thereto from said rear wheel steering mechanism, said resilient means being applied with a preload which is determined to be larger than a torque acting on said input and output elements in accordance with the steerage of the front road wheel during stopping or travel of the vehicle on a normal road.

2. A four-wheel steering system as claimed in claim 1, wherein said input and output elements are in the form of a pair of axially spaced input and output rotary members, and said resilient means comprises a preloaded spiral spring disposed between said rotary members to transmit torque of said input rotary member to said output rotary member without any deflection in a condition where said output rotary member is freely rotatable and to resiliently absorb the torque of said input rotary member in a condition where said output rotary member is restrained by an excessive load applied thereto from said rear wheel steering mechanism.

3. A four-wheel steering system as claimed in claim 2, wherein said spiral spring is wound around a support sleeve assembled with both said rotary members for rotation therewith, said spiral spring having an inner end engaged with said support sleeve and an outer end engaged with each outer peripheral portion of said rotary members.

4. A four-wheel steering system as claimed in claim 1, wherein said input and output elements are in the form of a pair of coaxial input and output rotary members, and said resilient means comprises a cylindrical slider axially slidably disposed within a radial bore in said input rotary member, a support rod coaxially arranged in said slider and fixed at one end thereof to said input rotary member, and a coil spring arranged in surrounding relationship with said support rod and being preloaded by engagement with a pair of axially spaced stoppers fixed to said support rod to resiliently retain said slider in a neutral position, and wherein said output rotary member has an end face formed with a spiral cam groove which receives a cam follower fixed to said slider.

5. A four-wheel steering system for an automotive vehicle, comprising a front wheel steering mechanism operable in response to a steering effort applied thereto to steer a set of dirigible front road wheels, a rear wheel steering mechanism arranged to steer a set of dirigible rear road wheel in response to steerage of the front road wheels, and a cable linkage operatively interconnecting said front and rear wheel steering mechanisms, wherein a displacement transmitting mechanism is provided on said cable linkage to transmit displacement of a front lateral bar in said front wheel mechanism to said rear wheel steering mechanism, said displacement transmitting mechanism including an input element operatively connected to said front lateral bar, an output element operatively connected to said rear wheel steering mechanism through said cable linkage, and resilient means disposed between said input and output elements to transmit displacement of said input element to said output element without any deflection in a condition where said output element is freely movable and to resiliently adsorb displacement of said input element in a condition wherein said output element is restrained by an excessive load applied thereto from said rear wheel steering mechanism, said resilient means being applied with a preload which is determined to be larger than a torque acting on said input and output elements in accordance with the steerage on the front road wheels during stopping or travel of the vehicle on a normal road.

6. A four-wheel steering system as claimed in claim 5, wherein said input and output elements are in the form of a pair of axially spaced input and output rotary members, and said resilient means comprises a preloaded spiral spring disposed between said rotary members to transmit torque of said input rotary member to said output rotary member without any deflection in a condition where said output rotary member is freely rotatable and to absorb resiliently the torque of said input rotary member in a condition where said output rotary member is restrained by an excessive load applied thereto from said rear wheel steering mechanism.

7. A four-wheel steering system as claimed in claim 6, wherein said spiral spring is wound around a support sleeve assembled with both said rotary members for rotation therewith, said spiral spring having an inner end engaged with said support sleeve and an outer end engaged with each outer peripheral portion of said rotary members.

8. A four-wheel steering system as claimed in claim 5, wherein said input and output elements are in the form of a pair of coaxial input and output rotary members, and said resilient means comprises a cylindrical slider axially slidably disposed within a radial bore in said input rotary member, a support rod coaxially arranged in said slider and fixed at one end thereof to said input rotary member, and a coil spring arranged in surrounding relationship with said support rod and being preloaded by engagement with a pair of axially spaced stoppers fixed to said support rods to resiliently retain said slider in a neutral position, and wherein said output rotary member has an end face formed with a spiral cam groove which receives a cam follower fixed to said slider.

9. A four-wheel steering system for an automotive vehicle, comprising a front wheel steering mechanism operable in response to a steering effort applied thereto to steer a set of dirigible front road wheels, a rear wheel steering mechanism arranged to steer a set of dirigible rear road wheels in response to steerage of the front road wheels, and a cable linkage operatively interconnecting said front and rear wheel steering mechanisms, wherein a displacement transmitting mechanism is provided on said cable linkage to transmit displacement of a front lateral bar in said front wheel steering mechanism, said displacement transmitting mechanism including an input element operatively connected to said front lateral bar through a front section of said cable linkage, an output element operatively connected to said rear wheel steering mechanism through a rear section of said cable linkage, and resilient means disposed between said input and output elements to transmit displacement of said input element to said output element without any deflection in a condition where said output element is freely movable and to resiliently absorb displacement of said input element in a condition where said output element is restrained by an excessive load applied thereto from said rear wheel steering mechanism, said resilient means being applied with a preload which is determined to be larger than a torque acting on said input and output elements in accordance with the steerage of the front road wheels during stopping or travel of the vehicle on a normal road.

10. A four-wheel steering mechanism as claimed in claim 9, wherein said input and output elements are in the form of a pair of axially spaced end plates disposed in a cylindrical guide member axially slidable in a casing, and wherein said resilient means comprises a preloaded coil spring disposed between said end plates.

11. A four-wheel steering system as claimed in claim 9, wherein said input and output elements are in the form of a pair of axially spaced input and output pulleys rotatably mounted within a housing, and wherein said resilient means comprises a cylindrical slider axially slidably disposed within said housing between said input and output pulleys, a support rod coaxially arranged in said slider, and a coil spring arranged in surrounding relationship with said support rod and being preloaded by engagement with a pair of axially spaced stoppers fixed to said support rod to resiliently retain said slider in a neutral position, and wherein said input pulley has a spiral cam groove formed thereon and engaged with an input cam follower fixed to ar outer end of said support rod, while said output pulley has a spiral cam groove formed thereon and engaged with an output cam follower fixed to a projection of said slider.

* * * * *